(12) United States Patent
Shibata

(10) Patent No.: US 12,248,712 B2
(45) Date of Patent: Mar. 11, 2025

(54) PRINTING SYSTEM TO DISPLAY OBJECT SELECTION, PRINTING METHOD, AND STORAGE MEDIUM

(71) Applicant: CANON KABUSHIKI KAISHA, Tokyo (JP)

(72) Inventor: Daisuke Shibata, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/179,747

(22) Filed: Mar. 7, 2023

(65) Prior Publication Data

US 2023/0289106 A1 Sep. 14, 2023

(30) Foreign Application Priority Data

Mar. 11, 2022 (JP) ................................. 2022-037902

(51) Int. Cl.
*G06F 3/12* (2006.01)
(52) U.S. Cl.
CPC .......... *G06F 3/1204* (2013.01); *G06F 3/1253* (2013.01); *G06F 3/1273* (2013.01); *G06F 3/1288* (2013.01)
(58) Field of Classification Search
None
See application file for complete search history.

(56) References Cited

U.S. PATENT DOCUMENTS

| 2006/0087680 A1* | 4/2006 | Maeda ................. G06F 3/1285 |
| | | 358/1.15 |
| 2011/0149332 A1* | 6/2011 | Cho ..................... G06F 21/608 |
| | | 358/1.14 |
| 2011/0235114 A1* | 9/2011 | Saitoh .................. G06F 3/1261 |
| | | 358/1.15 |
| 2022/0019393 A1* | 1/2022 | Hamada ............... G06F 3/1273 |
| 2022/0035580 A1* | 2/2022 | Awatsu ................ G06F 3/1292 |
| 2023/0252000 A1* | 8/2023 | Fujii .................... G06F 40/103 |
| | | 707/822 |

FOREIGN PATENT DOCUMENTS

JP 2014232342 A 12/2014

* cited by examiner

*Primary Examiner* — Thomas D Lee
(74) *Attorney, Agent, or Firm* — Canon U.S.A., Inc. IP Division

(57) ABSTRACT

A printing system includes a printing apparatus and a server, wherein the printing apparatus prints, based on image data, an image on a sheet, and wherein the server stores a history showing that a user accessed image data, identifies image data based on the stored history, and notifies the user of the identified image data, wherein the printing apparatus prints an image on a sheet based on image data selected by the user from image data that the user has been notified of.

9 Claims, 21 Drawing Sheets

FIG.7

```
{
  "type": "printSuggest",
  "timestamp": "2021-10-18T09:00:00Z",
  "body": {
    "message": "",
    "suggest": {
      "count": "4",
      "list": [
        {
          "fileId": "1011",
          "fileName": "XXXXSpecifications_v1.0.docx",
          "fileType": "docx",
          "reason": "updating of print history: XXXXSpecifications_v0.9.docx",
          "filePath": "http://123.45.67.89/doc/XXXX/Specifications/"
        },
        {
          "fileId": "1012",
          "fileName": "20211015_XXXX.pptx",
          "fileType": "pptx",
          "reason": "updating of print history: 20210925_XXXX.pptx",
          "filePath": "http://123.45.67.89/doc/meeting/20211015/"
        },
        {
          "fileId": "1018",
          "fileName": "YYYYProposal_RevisedVersion.pdf",
          "fileType": "pdf",
          "reason": "updating of print history: YYYYProposal.pdf",
          "filePath": "http://123.45.67.89/doc/YYYYCo./Proposal/"
        },
        {
          "fileId": "1014",
          "fileName": "October_2021_BriefingPaper.pptx",
          "fileType": "pptx",
          "reason": "updating of print history: September_2021_BriefingPaper.pptx",
          "filePath": "http://123.45.67.89/doc/MonthlyReport/October/"
        }
      ]
    }
  }
}
```

700

701 (covers type, timestamp, body/message)

702 (covers suggest list)

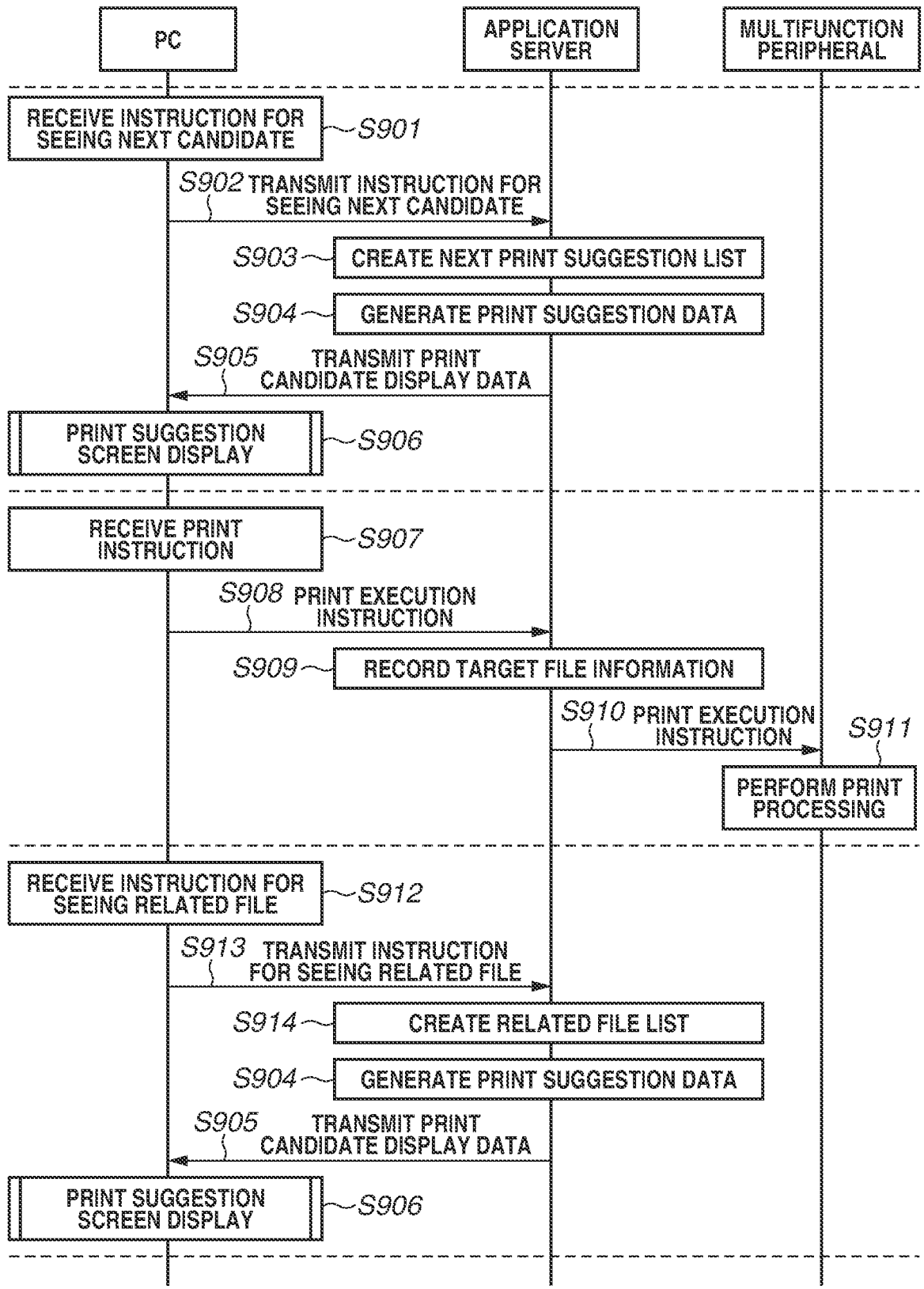

FIG.10A

SETTING OF PRINT SUGGESTION — 1000, 1001

SIMILAR FILE DETERMINATION

| 1002 | 1003 | 1004 | |
|---|---|---|---|
| DETERMINE PRIORITY BY NUMERICAL NOTATION OF FILE NAME | ON | OFF | |
| 1005 | 1006 | 1007 | 1011 |
| PRIORITIZE SAME FORMAT | ON | OFF | |
| 1008 | 1009 | 1010 | Revision, draft, or proposal is prioritized. |
| PRIORITIZE SET CHARACTER STRING | ON | OFF | |
| 1012 | 1013 | 1014 | |
| ASSEMBLE SIMILAR CANDIDATES | ON | OFF | |

1015 CANCEL  1016 OK

FIG.10B

PRINT HISTORY TARGET SELECTION — 1017

A print history to be used for print suggestion will be set.

1018 TARGET PRINT HISTORY  Histories obtained until  1019 [90]  days ago are targeted.

1020 ASSEMBLE SIMILAR HISTORIES  1021 ON  1022 OFF

HISTORY TARGET SELECTION — 1023

| ☐ ENABLING (1024) | DATE AND TIME (1025) | FILE NAME (1026) | PAGE COUNT (1027) |
|---|---|---|---|
| ✓ | 10/07 15:00 | XXXXSpecifications_v0.9.docx | 12 |
| ☐ | 10/01 17:15 | XXXXSpecifications_v0.8.docx | 10 |
| ✓ | 09/26 12:15 | 20210925_XXXX.pptx | 4 |
| ✓ | 09/23 16:00 | YYYYProposal.pdf | 6 |

1028 CANCEL  1029 OK

PRINTING SYSTEM TO DISPLAY OBJECT SELECTION, PRINTING METHOD, AND STORAGE MEDIUM

BACKGROUND

Field

Aspects of the present disclosure generally relate to a printing system, a printing method, and a storage medium.

Description of the Related Art

Storing a file in a file server located on a network to enable a plurality of users to manage and share the file has been spreading. There is a schedule management service for performing schedule management of a plurality of users, so that each user accesses the service via the user's own personal computer (PC) or terminal and then views, edits, or updates a schedule of the user or a group including the user. As a schedule to be managed in the schedule management service, in the case of arranging a meeting, performing registration while attaching a meeting material or indicating a storage location of a meeting material on a file server enables participants of the meeting to preliminarily check the meeting material.

Heretofore, there has been a system that enables easily viewing a document associated with a schedule or issuing an instruction for printing of the document. Such a system as discussed in Japanese Patent Application Laid-Open No. 2014-232342 includes an image forming apparatus, a schedule management server, and an information terminal. The image forming apparatus has the function of storing a document related to a schedule, and the image forming apparatus acquires a schedule from the schedule management server, acquires a link to a document stored in connection with the schedule, and creates an information material list for each schedule. Then, the image forming apparatus registers an object for calling up an information material onto the schedule stored in the schedule management server. This enables, when having acquired a schedule from the schedule management server via the information terminal, acquiring a schedule having, attached thereto, an object for accessing an information material related to the schedule.

Conventionally, the user has been required to first access the schedule management server to confirm or check a schedule, then check the presence or absence of a related document, and perform determination of, for example, viewing or printing.

SUMMARY

Aspects of the present disclosure are generally directed to reducing the user's trouble of searching for a document that the user desires to print.

According to an aspect of the present invention, a printing system includes a printing apparatus and a server, wherein the printing apparatus is configured to print an image, based on image data, on a sheet, and wherein the server is configured to store a history showing that a user accessed image data, to identify image data based on the stored history, and to notify the user of the identified image data, wherein printing the image on a sheet is based on image data selected by the user from image data that the user has been notified of.

Further features will become apparent from the following description of exemplary embodiments with reference to the attached drawings.

BRIEF DESCRIPTION OF THE DRAWINGS

FIG. 7 is a diagram illustrating a structure of print suggestion data.

FIG. 9 is a sequence diagram illustrating the flow of processing that is performed at the time of reception of an operation after displaying of a print suggestion screen.

FIGS. 10A and 10B are diagrams illustrating examples of a setting screen for print suggestion.

DESCRIPTION OF THE EMBODIMENTS

Various exemplary embodiments, features, and aspects of the disclosure will be described in detail below with reference to the drawings. The following exemplary embodiments are not intended to limit the scope of the present disclosure, and, not all of the combinations of features described in the exemplary embodiments are necessarily essential for solutions in the present disclosure.

Figure 1:
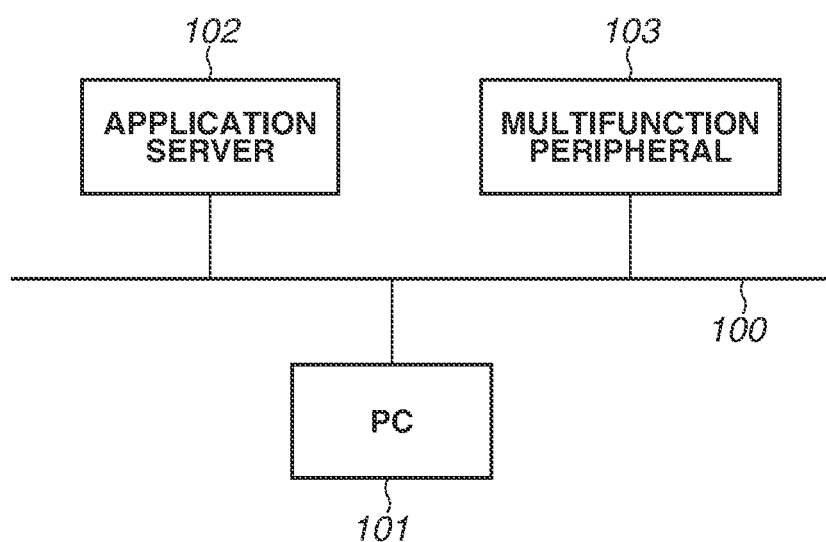
FIG. 1 is a diagram illustrating a configuration example of a printing system in which apparatuses are network-connected in a first exemplary embodiment.

FIG. 1 is a block diagram illustrating a network configuration example of apparatuses which are interconnected as a printing system in a first exemplary embodiment. A personal computer (PC) 101, an application server 102, and a multifunction peripheral 103 are interconnected in such a way as to communicate with each other via a network 100.

The PC 101, which is an information processing apparatus, is used by the user. The PC 101 has the functions of, for example, viewing of, editing of, and issuing a print instruction about a file stored in a shared manner by a file server included in the multifunction peripheral 103, which is a printing apparatus or an image forming apparatus, via the network 100. The PC 101 has the functions of viewing and editing of a schedule registered with a schedule management service that runs on the application server 102. The PC 101 has the function of causing an application, which receives a print candidate from a suggestion service running on the application server 102, to run and performing notification of a print suggestion to the user.

The application server 102, on which the schedule management service and the suggestion service run, can communicate with the PC 101 and the multifunction peripheral 103 via the network 100. The schedule management service of the application server 102 has a schedule management function for the user who gains access, which is the function of responding to schedule viewing, schedule addition, and schedule editing requested from the PC 101. The suggestion service has the function of communicating with the schedule management service and a file server, which runs on the multifunction peripheral 103, performing estimation of a print candidate to be used by the user, and notifying the PC 101 of the estimated print candidate.

The multifunction peripheral 103 is a device that prints print data received via the network 100 on a sheet using a known print technology, such as an electrophotographic technique or inkjet technique. The multifunction peripheral 103 has the functions of reading a paper document via a scanner, performing copying, and performing conversion into image data to transmit the image data via, for example, e-mail. The multifunction peripheral 103 does not need to include a scanner function, but just include a printer function. The multifunction peripheral 103 has a file server function to manage files stored in the multifunction peripheral 103, which includes the function of responding to file access requests received from the PC 101 and the application server 102 via the network 100.

Figure 2A:
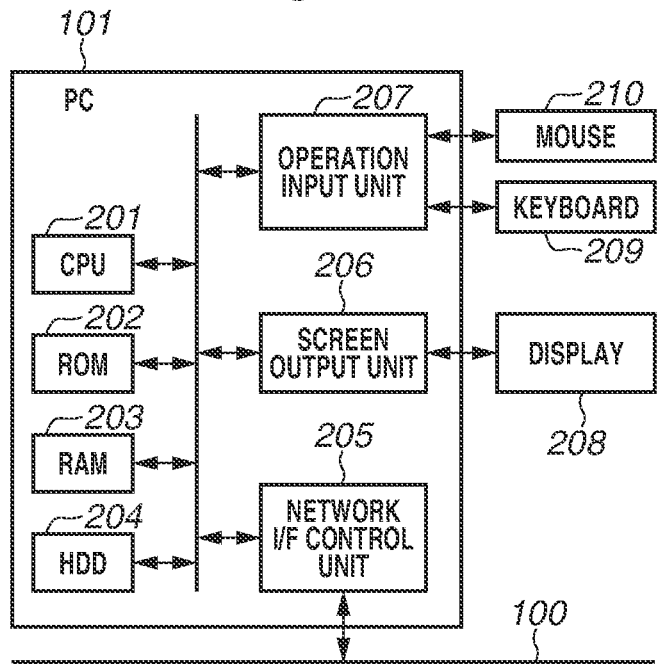
FIGS. 2A, 2B, and 2C are diagrams illustrating configuration examples of pieces of hardware that configure the printing system.
Figure 2B:
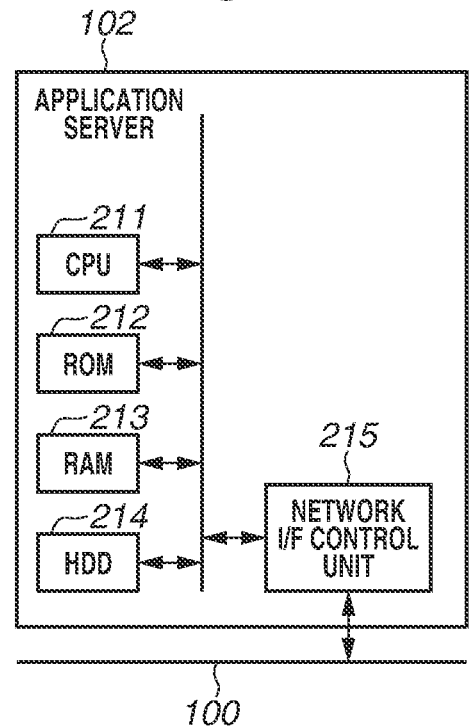
Figure 2C:
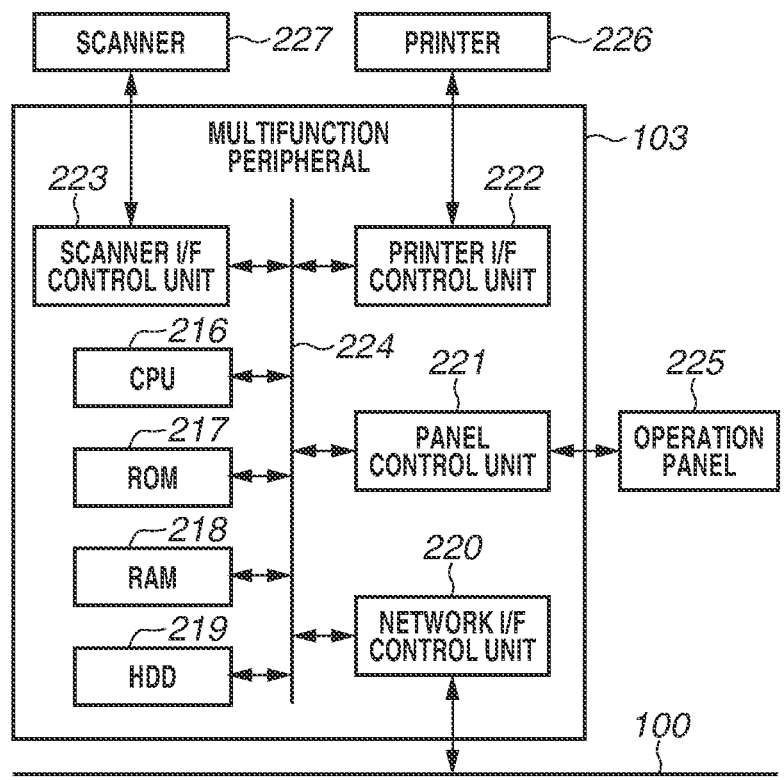

FIGS. 2A, 2B, and 2C are block diagrams illustrating hardware configurations of the PC 101, application server 102, and multifunction peripheral 103 according to the first exemplary embodiment.

FIG. 2A is a block diagram illustrating a hardware schematic configuration of the PC 101. A central processing unit (CPU) 201 executes software programs installed on the PC 101, thus performing control of the entire PC 101. A read-only memory (ROM) 202 stores, for example, a boot program for the PC 101 and fixed parameters. A random access memory (RAM) 203 is used for the CPU 201 to, when controlling the PC 101, for example, store a program or temporary data. A hard disk drive (HDD) 204 stores system software, applications, and various pieces of data. The CPU 201 executes the boot program stored in the ROM 202, loads a program stored in the HDD 204 onto the RAM 203, and executes the loaded program, thus controlling operations of the PC 101. A network interface (I/F) control unit 205 controls transmission and reception of data with respect to the network 100. A screen output unit 206 controls an image to be displayed on a display 208, which is a display unit. An operation input unit 207 controls an input instruction from the user received via a mouse 210 or a keyboard 209, which is an operation device (operation unit). The CPU 201, the ROM 202, the RAM 203, the HDD 204, the network I/F control unit 205, the screen output unit 206, and the operation input unit 207 are connected to each other, between which control signals from the CPU 201 or data signals are transmitted and received.

FIG. 2B is a block diagram illustrating a hardware schematic configuration of the application server 102.

A CPU 211 executes a software program installed on the application server 102, thus controlling the entire application server 102. A read-only memory (ROM) 212 stores, for example, a boot program for the application server 102 and fixed parameters. A random access memory (RAM) 213 is used for the CPU 211 to, when controlling the application server 102, for example, store a program or temporary data. A hard disk drive (HDD) 214 stores system software, applications, software for the suggestion service and the schedule management service, which run on the server, and various pieces of data. The CPU 211 executes the boot program stored in the ROM 212, loads a program stored in the HDD 214 onto the RAM 213, and executes the loaded program, thus controlling operations of the application server 102. A network interface (I/F) control unit 215 controls transmission and reception of data with respect to the network 100. The application server 102 controls displaying of various pieces of information and instruction inputs from the user received from, for example, the PC 101 via the network I/F control unit 215. The CPU 211, the ROM 212, the RAM 213, the HDD 214, and the network I/F control unit 215 are connected to each other, between which control signals from the CPU 211 or data signals are transmitted and received.

FIG. 2C is a block diagram illustrating a hardware schematic configuration of the multifunction peripheral 103. A CPU 216 executes a software program installed on the multifunction peripheral 103, thus controlling the entire multifunction peripheral 103. A read-only memory (ROM) 217 stores, for example, a boot program for the multifunction peripheral 103 and fixed parameters. A random access memory (RAM) 218 is used for the CPU 216 to, when controlling the multifunction peripheral 103, for example, store a program or temporary data. A hard disk drive (HDD) 219 stores system software, applications, and various pieces of data. The CPU 216 executes the boot program stored in the ROM 217, loads a program stored in the HDD 219 onto the RAM 218, and executes the loaded program, thus controlling operations of the multifunction peripheral 103. A network I/F control unit 220 controls transmission and reception of data with respect to the network 100. A scanner I/F control unit 223 controls reading of an original to be performed by a scanner 227, which is a reading unit. A printer I/F control unit 222 controls, for example, print processing to be performed by a printer 226, which is a printing unit. The printer 226 can print an image on a sheet based on print data. A panel control unit 221 controls an operation panel 225 of the touch panel type, thus controlling displaying of various pieces of information and input instructions received from the user. A bus 224 connects the CPU 216, the ROM 217, the RAM 218, the HDD 219, the network I/F control unit 220, the scanner I/F control unit 223, the printer I/F control unit 222, and the panel control unit 221 to each other. Control signals from the CPU 216 or data signals are transmitted and received via the bus 224.

FIGS. 3A, 3B, 3C, and 3D are block diagrams illustrating software modules included in the PC 101, the application server 102, and the multifunction peripheral 103 of the printing system in the first exemplary embodiment. More specifically, the following description discusses an example where a notification application 300 runs on the PC 101, a suggestion service 310 and a schedule management service 330 run on the application server 102, and a file server 320 runs on the multifunction peripheral 103 is described.

Figure 3A:
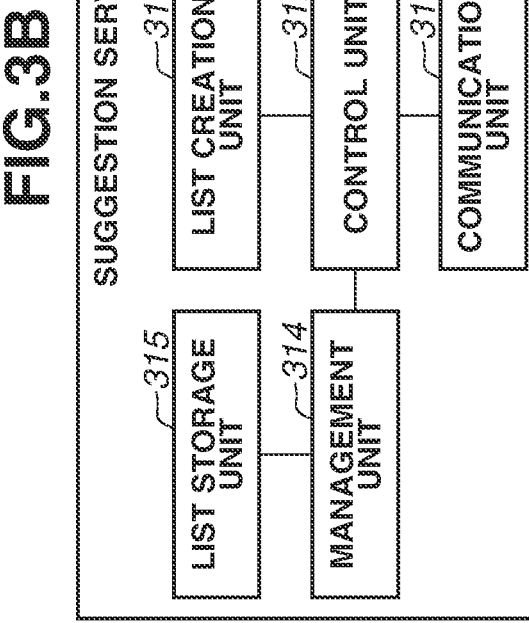
FIGS. 3A, 3B, 3C, and 3D are diagrams illustrating configuration examples of pieces of software that configure the printing system.

FIG. 3A is a block diagram illustrating software modules of the notification application 300 included in the PC 101 in the first exemplary embodiment. The notification application 300 illustrated in FIG. 3A is implemented by the CPU 201 executing a program loaded onto the RAM 203. A communication unit 301 controls the network I/F control unit 205 connected to the network 100, thus performing transmission and reception of data with respect to an external apparatus via the network 100. A control unit 302 controls the entire notification application 300, thus performing control to receive data received by the communication unit 301 and control to transmit data to an external apparatus via the communication unit 301. The control unit 302 instructs a message generation unit 304 to generate a message based on the received data, issues a notification for the generated message via a notification unit 303, and receives an operation received by a reception unit 305 to determine an operation to be performed next. The notification unit 303 operates in such a way as to display a notification screen for print suggestion on the display 208 via the screen output unit 206. The message generation unit 304 generates a screen via which the notification unit 303 issues a notification, based on print suggestion data 700 received by the communication unit 301. The message generation unit 304 determines a message based on a message type written in the print suggestion data 700 to fix a configuration of the message, and configures configuration information, which is to be written in the inside of the message, with use of information read out from the print suggestion data 700. The reception unit 305 determines an instruction content issued by the user via the keyboard 209 or the mouse 210 and received by the operation input unit 207 with respect to a screen displayed for notification on the display 208 by the notification unit 303, and requests the control unit 302 to perform control corresponding to the determined instruction content.

Figure 3B:
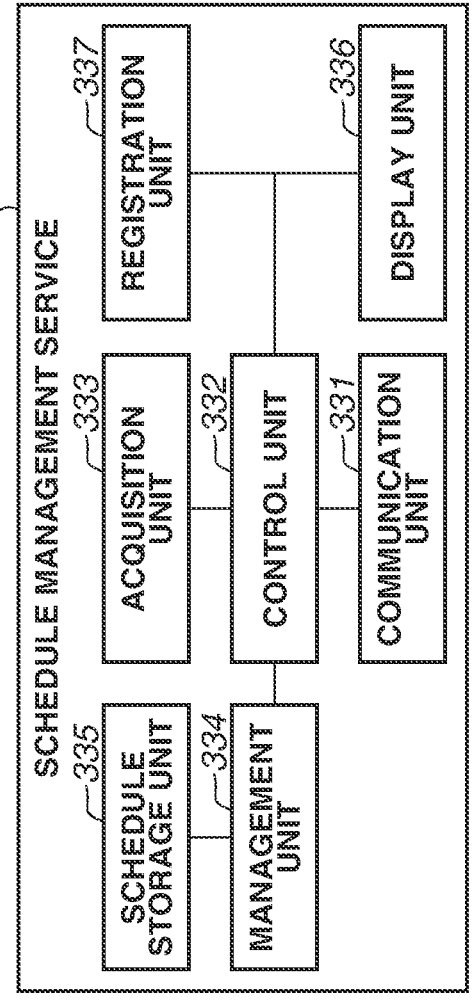

FIG. 3B is a block diagram illustrating software modules of the suggestion service 310 included in the application server 102 in the first exemplary embodiment. The suggestion service 310 illustrated in FIG. 3B is implemented by the CPU 211 executing a program loaded onto the RAM 213. A communication unit 311 controls the network I/F control unit 215 connected to the network 100, thus performing transmission and reception of data with respect to an external apparatus via the network 100. A control unit 312 controls the entire suggestion service 310, thus performing control to receive data received by the communication unit 311 and control to transmit data to an external apparatus via the communication unit 311.

The control unit 312 instructs a management unit 314 to manage a print candidate list, instructs a list creation unit 313 to generate a print candidate list, instructs a priority estimation unit 317 to estimate the priority (degree of priority) of a print candidate list, and receives a notification timing of print suggestion from a notification determination unit 316. The list creation unit 313 receives an instruction from the control unit 312 and creates a list of files that the designated target user is able to access. The list creation unit 313 accesses the file server 320 via the communication unit 311, acquires files that the target user is able to access from among the files that the file server 320 manages, and registers the acquired files in a list. The management unit 314 performs control to record a print candidate list created by the list creation unit 313 via the control unit 312 in a list storage unit 315. When having received an acquisition request for a list from the control unit 312, the management unit 314 acquires a list corresponding to the acquisition request from the list storage unit 315 and notifies the control unit 312 of the acquired list. The list storage unit 315 records a print candidate list on the HDD 214, reads out a print candidate list in response to a request, and performs rewriting of a print candidate list. The notification determination unit 316 performs notification determination processing for determining a notification timing of print suggestion and issuing an instruction for notification. The notification determination unit 316 receives a notification setting for each user from the control unit 312 and determines a notification timing in conformity with the notification setting. In determining a notification timing, the notification determination unit 316 periodically performs notification determination with use of a timer (not illustrated) included in the application server 102, or performs determination of a notification based on a schedule for each user via the communication unit 311. The priority estimation unit 317 reads out a print candidate list and estimates the degree of priority of a candidate recorded in the list. In estimating the degree of priority, the priority estimation unit 317 acquires user information, file information and file attributes that the file server 320 manages, and a schedule of the user that the schedule management service 330 manages, and determines the degree of priority of each candidate recorded in the print candidate list based on the acquired pieces of information.

Figure 3C:
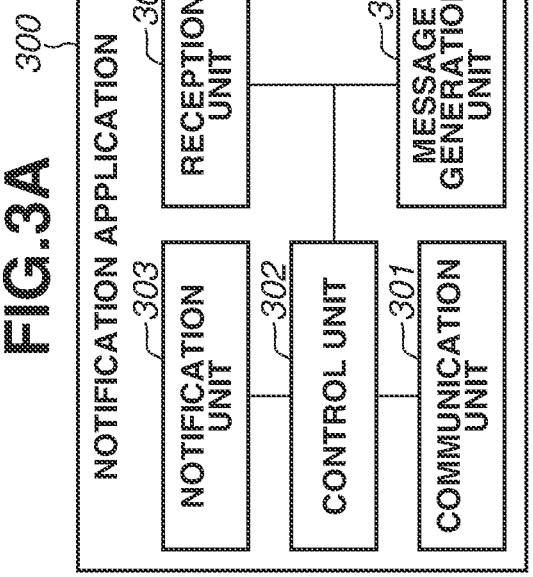

FIG. 3C is a block diagram illustrating software modules of the file server 320 included in the multifunction peripheral 103 in the first exemplary embodiment. The file server 320 illustrated in FIG. 3C is implemented by the CPU 216 executing a program loaded onto the RAM 218. A communication unit 321 controls the network I/F control unit 220 connected to the network 100, thus performing transmission and reception of data with respect to an external apparatus via the network 100. A control unit 322 controls the entire file server 320, thus performing control to receive data received by the communication unit 321 and control to transmit data to an external apparatus via the communication unit 321. The control unit 322 instructs an acquisition unit 323 to manage a file list that the file server 320 manages and instructs a management unit 324 to manage reading-out and writing-in of a file that the file server 320 manages. The acquisition unit 323 receives an instruction from the control unit 322, acquires a content designated with regard to a file, and generates information to be transmitted to a requestor as a response. As an acquisition instruction regarding a file, the acquisition unit 323 is able to receive a file itself, a storage location about a file, and attribute information such as a file format and a file size, and performs control to read out the received content and acquire such a content from the management unit 324. The management unit 324 receives an instruction for reading-out or writing-in of a file via the control unit 322, and controls reading-out from or recording in a file storage unit 325. The file storage unit 325 records a file on the HDD 219 and performs reading-out or rewriting in response to a request.

Figure 3D:
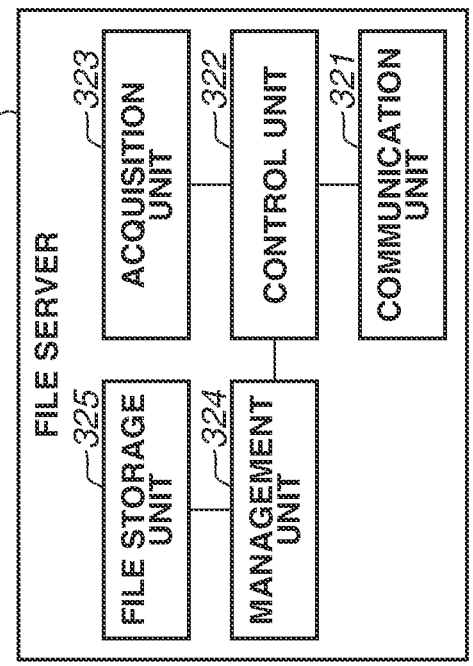

FIG. 3D is a block diagram illustrating software modules of the schedule management service 330 included in the application server 102 in the first exemplary embodiment. The schedule management service 330 illustrated in FIG. 3D is implemented by the CPU 211 executing a program loaded onto the RAM 213. A communication unit 331 controls the network I/F control unit 215 connected to the network 100, thus performing transmission and reception of data with respect to an external apparatus via the network 100. A control unit 332 controls the entire schedule management service 330, thus performing control to receive data received by the communication unit 331 and control to transmit data to an external apparatus via the communication unit 331. The control unit 332 instructs a management unit 334 to manage a schedule, instructs an acquisition unit 333 to acquire the requested schedule, instructs a registration unit 337 to register a schedule, and acquires information for displaying a schedule for the user requested from a display unit 336. The acquisition unit 333 is a unit which, in response to an acquisition request for a schedule received from the communication unit 331 via the control unit 332, acquires the requested schedule from the management unit 334 and generates a response to the acquisition request. The management unit 334 receives a request for, for example, acquisition, updating, creation, or deletion of a schedule from the control unit 332, reads out the schedule in a schedule storage unit 335, and performs management of recording. The schedule storage unit 335 records a schedule on the HDD 214, reads out a schedule in response to a request, and performs rewriting. The display unit 336 performs control to receive a schedule displaying request received from the communication unit 331 via the control unit 332, acquire a schedule content, convert the schedule content into a displayable format, and transmit the converted schedule content as a response. The registration unit 337 is a unit that receives a registration request for a schedule received from the communication unit 331 via the control unit 332, checks the consistency of a registration content, and instructs the management unit 334 to record the schedule.

Figure 4:
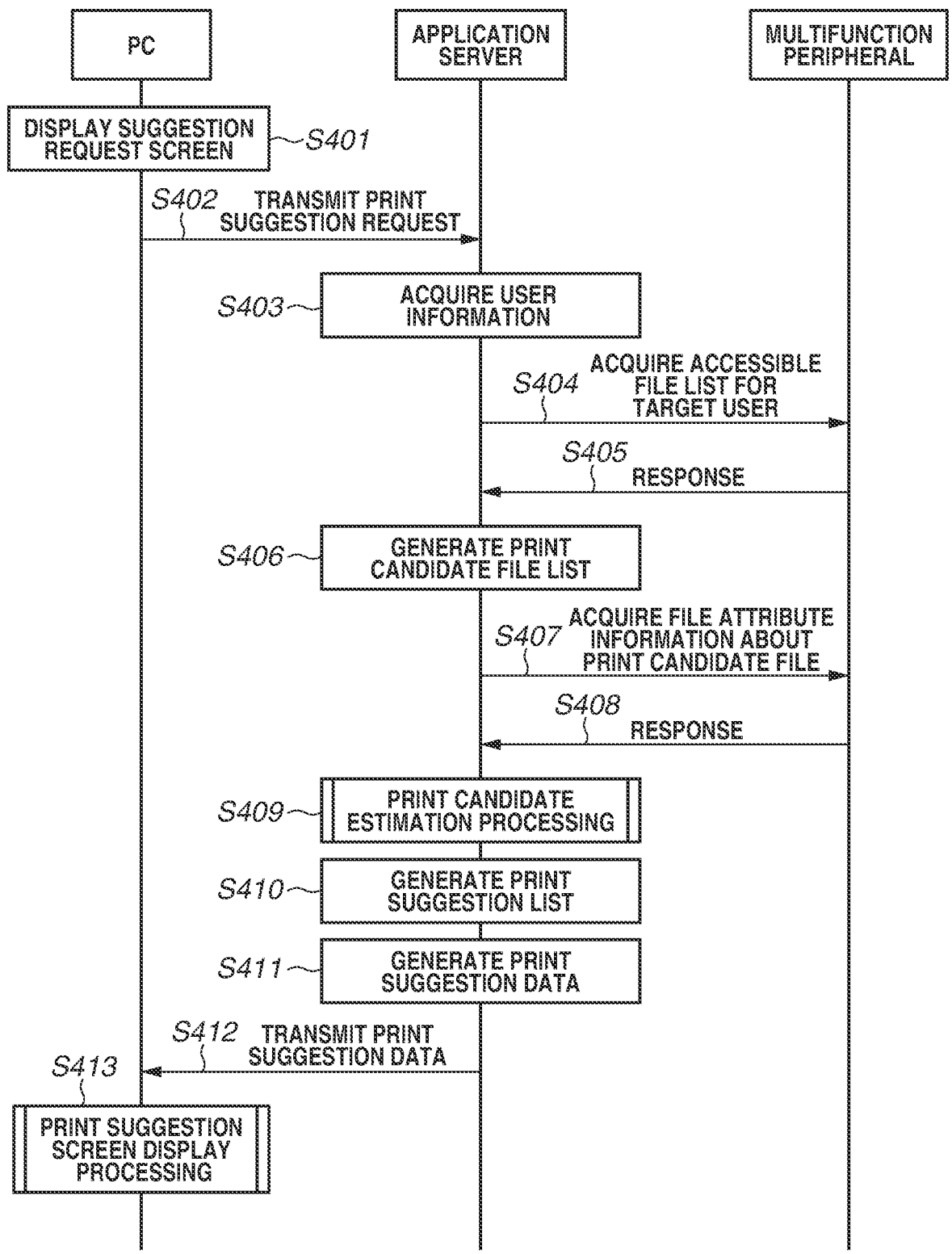
FIG. 4 is a sequence diagram illustrating the flow of notification processing for print suggestion.

FIG. 4 is a sequence diagram illustrating the flow of processing in which, in the printing system in the first exemplary embodiment, the notification application 300 receives a print suggestion request from the user, the suggestion service 310 estimates a print candidate, and the PC 101 displays a print candidate list.

As described above, in the first exemplary embodiment, the PC 101, the application server 102, and the multifunction peripheral 103 constitute the printing system. In the PC 101, which is an information terminal that the user manipulates, the notification application 300, which receives a print suggestion request and displays a print candidate list, runs. In the application server 102, the suggestion service 310, which performs estimation of a print candidate, and the schedule management service 330, which manages a schedule of the user, run. In the multifunction peripheral 103, the file server 320, in which files are stored and which performs file sharing between apparatuses, runs and performs control to receive an operation performed by the user and a print instruction issued by the user.

While, in the first exemplary embodiment, the PC 101, the application server 102, and the multifunction peripheral 103 are provided as separate apparatuses, in another exemplary embodiment, the multifunction peripheral 103 can be configured to include the suggestion service 310 or the schedule management service 330. In another exemplary embodiment, the file server 320, which operates in the multifunction peripheral 103, can be configured to operate in the application server 102. In still another exemplary embodiment, the suggestion service 310, the file server 320, and the schedule management service 330 can be configured to operate on respective independent servers, and, additionally, can be configured to operate on an on-premise server or a cloud service separately provided.

A series of processing operations in the present sequence is performed by the PC 101, the application server 102, and the multifunction peripheral 103 of the printing system. Processing operations on a PC are performed by the notification application 300, which runs by a control program read out from the ROM 202 and loaded onto the RAM 203 by the CPU 201 of the PC 101. Processing operations on an application server are performed by the suggestion service 310 and the schedule management service 330, which run by a control program read out from the ROM 212 and loaded onto the RAM 213 by the CPU 211 of the application server 102. Processing operations on a multifunction peripheral are performed by the file server 320, which runs by a control program read out from the ROM 217 and loaded onto the RAM 218 by the CPU 216 of the multifunction peripheral 103.

The processing sequence is started with the notification application 300 on the PC 101 performing determination of a print suggestion request notification issued by the user.

In step S401, the notification application 300 displays a suggestion request screen, and, when receiving an instruction for a print suggestion request here, advances the processing to step S402. The suggestion request screen is described in detail below with reference to FIGS. 6A and 6B.

In step S402, the notification application 300 transmits a print suggestion request to the suggestion service 310 on the application server 102. The print suggestion request is transmitted with user information identifying a user who is using the notification application 300 being appended to the print suggestion request. Upon receiving the print suggestion request, the suggestion service 310 advances the processing to step S403. The user information that is appended to the print suggestion request can be, for example, user information acquired from a service that is authenticated and managed in common by the PC 101, the application server 102, and the multifunction peripheral 103.

In step S403, the suggestion service 310 acquires information about a user for which to perform estimation of a print candidate, from the received a print suggestion request, and then advances the processing to step S404.

In step S404, the suggestion service 310 requests an accessible file list, which the target user is able to access with use of information about the target user acquired in step S403, from the file server 320 on the multifunction peripheral 103, and then advances the processing to step S405. Here, the content that is registered in the accessible file list is shown in Table 1. The accessible file list is generated for each user and is a list of files or folders that the user is able to access. The accessible file list has, recorded therein, information about the name of each file or folder, the type thereof, and the location where each file or folder is stored on the file server 320.

TABLE 1

Accessible File List

| Name | Type | Location |
|---|---|---|
| XXXXSpecifications_v1.0.docx | docx | //Srv/doc/XXXX/Specifications/ |
| 20211015_XXXX.pptx | pptx | //Srv/doc/meeting/20211015/ |
| YYYYProposal_RevisedVersion.pdf | pdf | //Srv/doc/YYYYCo./Proposal/ |
| October_2021_BriefingPaper.pptx | pptx | //Srv/doc/MonthlyReport/Oct./ |

In step S405, the file server 320 generates, based on the received user information, an accessible file list that the corresponding user is able to access, and notifies the suggestion service 310, which is a requestor, of the generated accessible file list as a response. The suggestion service 310 records the received accessible file list on the RAM 213, and then advances the processing to step S406.

In step S406, the suggestion service 310 reads out the accessible file list recorded in step S405, and performs determination processing for determining whether each file on the accessible file list serves as a target for a print candidate. Here, the suggestion service 310 generates an ID in such a way as to enable uniquely identifying a file serving as a print candidate, generates a print candidate file list in which the ID, name, type, and location of each file are recorded, records the print candidate file list on the RAM 213, and then advances the processing to step S407. Here, the suggestion service 310 determines whether each file is a print candidate target, based on the type of the file, such as the txt format, word format, or pdf format, which is used as a print target. The suggestion service 310 can determine whether each file is a print candidate target, based on, instead of the type of a file, for example, a file name or the storage location of a file.

In step S407, the suggestion service 310 reads out the print candidate file list stored in the RAM 213, requests the file server 320 to acquire an attribute of each file existing in the print candidate file list, and then advances the processing to step S408. The attribute information about each file to be requested for acquisition includes the date and time of update of the file, a creator thereof, a page setting thereof, and a page count (the number of pages) thereof. The suggestion service 310 can designate an attribute individually and request the attribute, or can request collectively acquiring information that is managed as file attribute information.

In step S408, the file server 320 acquires the requested file attribute information about each file, and notifies the suggestion service 310 of the file attribute information as a response. The suggestion service 310 adds the received file attribute information to the print candidate file list, stores the print candidate file list with the file attribute information added thereto in the HDD 214, and then advances the processing to step S409. Here, the print candidate file list is described with reference to Table 2. The print candidate file list is a list in which files each determined as a print target in step S404 from the accessible file list are recorded. In the print candidate file list, an ID, name, type, and location for uniquely identifying a file, which have been generated in step S406, are recorded. File attribute information acquired in step S408 is also recorded therein. Here, as the file attribute information, the date and time of update of a file, a creator thereof, a page setting thereof, and a page count thereof are recorded.

Depending on the type of a file, a page setting or a page count may not exist, and, in that case, a value indicating that such information is not applicable is registered.

TABLE 2

Print Candidate File List

| ID | Name | Type |
|---|---|---|
| 1011 | XXXXSpecifications_v1.0.docx | docx |
| 1012 | 20211015_XXXX.pptx | pptx |
| 1018 | YYYYProposal_RevisedVersion.pdf | pdf |
| 1014 | October_2021_BriefingPaper.pptx | pptx |

| ID | Location | Date and Time of Update |
|---|---|---|
| 1011 | //Srv/doc/XXXX/Specifications/ | 10/15 11:49 |
| 1012 | //Srv/doc/meeting/20211015/ | 10/15 15:20 |
| 1018 | //Srv/doc/YYYYCo./Proposal/ | 10/10 9:30 |
| 1014 | //Srv/doc/MonthlyReport/Oct./ | 10/18 13:15 |

| ID | Creator | Page Setting | Page Count |
|---|---|---|---|
| 1011 | User A | A4 | 12 |
| 1012 | User A | — | 4 |
| 1018 | User A | A4 | 6 |
| 1014 | User A | — | 20 |

In step S409, the suggestion service 310 performs print candidate estimation processing. The details of the print candidate estimation processing are described below with reference to FIG. 5. The suggestion service 310 stores an estimation result list as a result of the print candidate estimation processing being ended in the HDD 214, and advances the processing to step S410. The estimation result list is described with reference to Table 3. In the estimation result list, an ID for identifying a file, a priority (degree of priority) that is a result of estimation processing of each file, and a reason for priority indicating information based on which the priority has been determined are recorded. Here, an example in which, assuming that the priority takes values of "0" to "10", the priority is set forth based on the criterion that, as the numerical value is larger, the priority is higher, and "0" is treated as a value indicating that the file is not applicable as a print candidate is shown. While the reason for priority is determined by the print candidate estimation processing, here, since the priority is determined based on a schedule, information about a relevant schedule is set forth. In another exemplary embodiment, the priority in the print candidate estimation processing can be determined based on the content of estimation processing.

TABLE 3

Estimation Result List

| ID | Priority | Reason for Priority |
|---|---|---|
| 1011 | 10 | Similarity to Print History: XXXXSpecifications_v0.9.docx |
| 1012 | 9 | Similarity to Print History: 20210925_XXXX.pptx |
| 1018 | 8 | Similarity to Print History: YYYYProposal.pdf |
| 1014 | 7 | Similarity to Print History: September_2021_BriefingPaper.pptx |

In step S410, the suggestion service 310 acquires a predetermined number of higher-order items from the estimation result list stored as a result of the print candidate estimation processing performed in step S409, acquires file information included in the predetermined number of higher-order items from the print candidate file list, and thus generates a print suggestion list. The suggestion service 310 stores the generated print suggestion list in the RAM 213, and then advances the processing to step S411. Here, the number of items in the print suggestion list can be changed depending on the number of files in the print candidate file list, or can be a number that is set by the user as the number of items in the print suggestion list. Table 4 illustrates an example of the print suggestion list. The print suggestion list is generated by acquiring the ID, name, type, and location of a file determined as a print suggestion target from the print candidate file list and acquiring the reason for priority from the estimation result list.

TABLE 4

Print Suggestion List

| ID | Name | Type |
|---|---|---|
| 1011 | XXXXSpecifications_v1.0.docx | docx |
| 1012 | 20211015_XXXX.pptx | pptx |
| 1018 | YYYYProposal_RevisedVersion.pdf | pdf |
| 1014 | October_2021_BriefingPaper.pptx | pptx |

TABLE 4-continued

Print Suggestion List

| ID | Location | Reason for Priority |
|---|---|---|
| 1011 | //Srv/doc/XXXX/Specifications/ | Similarity to Print History: XXXXSpecifications_v0.9.docx |
| 1012 | //Srv/doc/meeting/20211015/ | Similarity to Print History: 20210925_XXXX.pptx |
| 1018 | //Srv/doc/YYYYCo./Proposal/ | Similarity to Print History: YYYYProposal.pdf |
| 1014 | //Srv/doc/MonthlyReport/Oct./ | Similarity to Print History: September_2021_Briefing-Paper.pptx |

In step S411, the suggestion service 310 generates print suggestion data with use of data about print targets stored in the print suggestion list, and then advances the processing to step S412. The data structure of the print suggestion data is described in detail below with reference to FIG. 7.

In step S412, the suggestion service 310 transmits the print suggestion data to the notification application 300, and then advances the processing to step S413.

In step S413, the notification application 300 performs processing for displaying a print suggestion screen based on the transmitted print suggestion data. The details of the processing for displaying a print suggestion screen are described below with reference to FIG. 8. After the completion of displaying of the print suggestion screen, the notification application 300 ends the present sequence.

Figure 5:
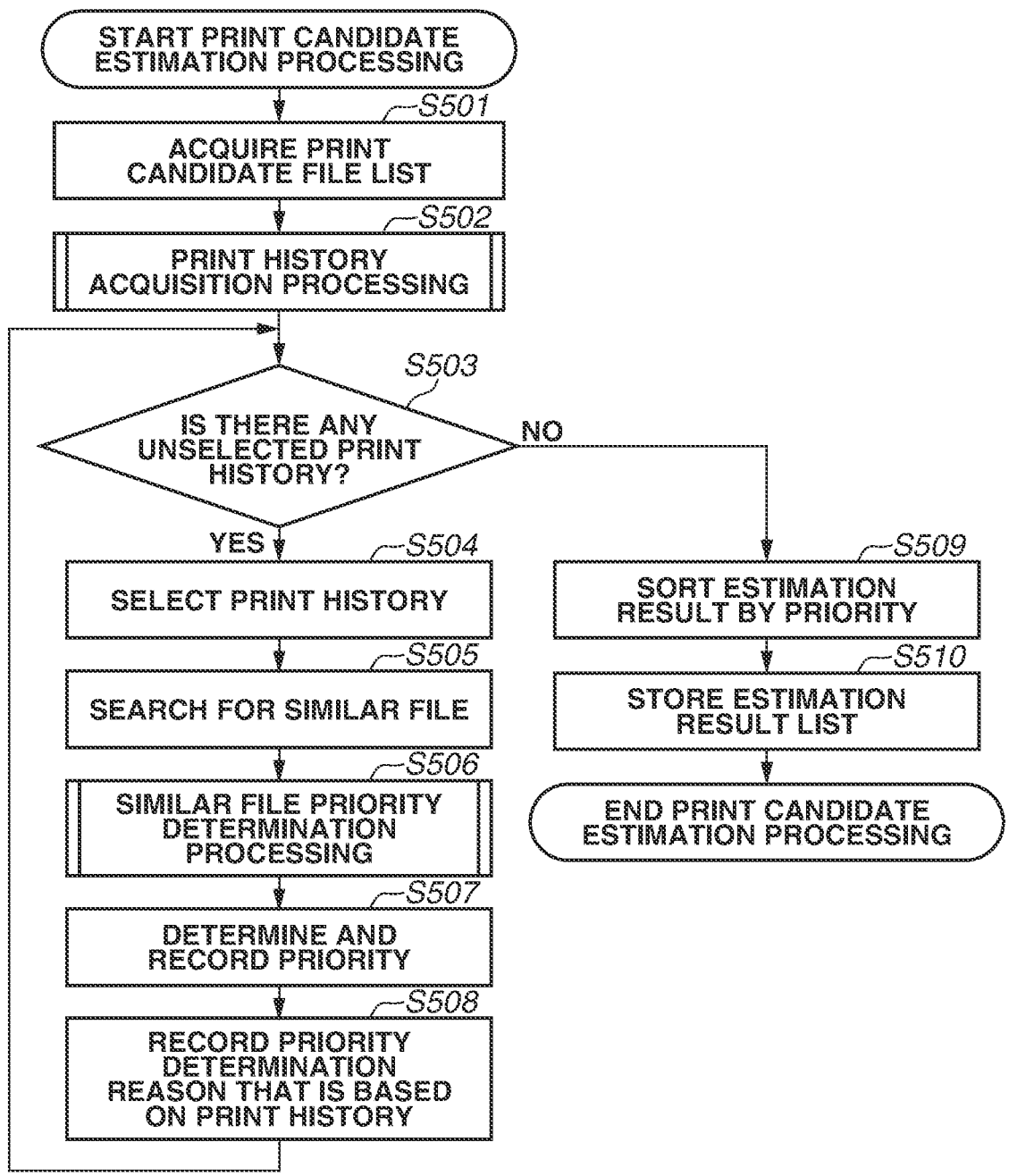
FIG. 5 is a flowchart illustrating the flow of print candidate estimation processing.

FIG. 5 is a flowchart illustrating the print candidate estimation processing, which is performed in step S409 illustrated in FIG. 4. The print candidate estimation processing is performed by the suggestion service 310, which runs by a control program read out from the ROM 212 and loaded onto the RAM 213 by the CPU 211 included in the application server 102.

In step S501, the suggestion service 310 reads out a print candidate file list from the HDD 214, records the print candidate file list on the RAM 213, and then advances the processing to step S502.

In step S502, the suggestion service 310 performs print history acquisition processing for acquiring a print history of the corresponding user from the file server 320. The details of the print history acquisition processing are described in detail below with reference to FIG. 12. The suggestion service 310 records the print history acquired in this processing on the RAM 213, and then advances the processing to step S503. In the file server 320, a history representing when which user accessed print data (for example, image data) stored in the file server 320 or how many times the user accessed the print data is stored. Here, accessing means the user performing printing, displaying, or updating of print data on the file server 320. Thus, on the file server 320, the history is updated every time the user performs an operation for displaying, printing, or updating print data. In the present exemplary embodiment, the application server 102 can specify a candidate for print data of which to notify the user, based on the history of access. For example, the application server 102 can specify a candidate for print data of which to notify the user, based on a frequency at which the user accessed given print data. The history can be stored in the file server 320 or can be stored in the application server 102.

In step S503, the suggestion service 310 determines whether there is any unselected print history out of the acquired print histories. If it is determined that there is an unselected print history (YES in step S503), the suggestion service 310 advances the processing to step S504, and, if it is determined that there is no unselected print history (NO in step S503), the suggestion service 310 advances the processing to step S509.

In step S504, the suggestion service 310 selects one unselected print history starting with a print history closer to the current time out of the print histories stored in the RAM 213, and then advances the processing to step S505.

In step S505, the suggestion service 310 searches for a file similar to a printed file written in the selected print history from within the print candidate file list, and thus creates a list of similar files. In searching for a similar file, first, the suggestion service 310 specifies a character string with the date format or a character string representing a version in the file name of a printed file written in the print history and then determines a specific name by excluding the specified character string from the file name. Then, the suggestion service 310 acquires, from the print candidate file list, a file the specific name of which coincides with that of the printed file and the character string portion with a specific format of which is changed. Here, in a case where a plurality of files has been found, the suggestion service 310 records all of the found files in a list of similar files, and, after recording the similar file list on the RAM 213, advances the processing to step S506.

In step S506, the suggestion service 310 performs similar file priority determination processing for determining a highest-priority similar file from the similar file list recorded on the RAM 213. The details of the similar file priority determination processing are described below with reference to FIG. 13. The suggestion service 310 stores a similar file list obtained as a result of the similar file priority determination processing in the HDD 214, and then advances the processing to step S507.

In step S507, the suggestion service 310 selects a file determined as a highest-priority similar file from within the similar file list recorded on the HDD 214, and determines the priority of the selected file with use of a print history and file attribute information included in the print candidate file list. The suggestion service 310 records the thus-determined priority along with a file ID as an estimation result list on the RAM 213, and then advances the processing to step S508.

In step S508, the suggestion service 310 determines a reason for priority for which the suggestion service 310 has determined the priority in step S507. Here, the suggestion service 310 determines the reason for priority based on having determined that the selected file is a highest-priority similar file selected from among files similar to the file name of a printed file in the print history. For example, in a case where the selected file is "XXXX_20201005.pptx", the suggestion service 310 determines information indicating "updating of print history: XXXX_20200312.pptx" as the reason for priority. The suggestion service 310 records the thus-determined reason for priority in the item of reason for priority of the estimation result list, and then returns the processing to step S503.

In step S509, the suggestion service 310 performs sorting of the estimation result list stored in the RAM 213 according to the setting of priority, and then advances the processing to step S510. Here, the suggestion service 310 determines that a candidate to which the setting of priority is not applied is lower in priority than a candidate to which the setting of priority is applied.

In step S510, the suggestion service 310 stores the estimation result list sorted in step S509 in the HDD 214, and ends the processing in the present flowchart.

Figure 6A:
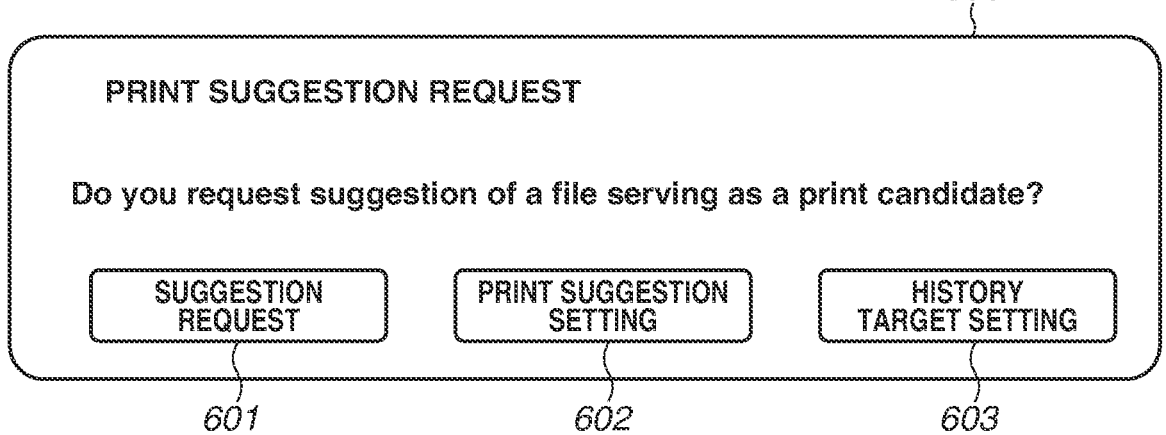
FIGS. 6A and 6B are diagrams illustrating examples of a print suggestion screen.
Figure 6B:
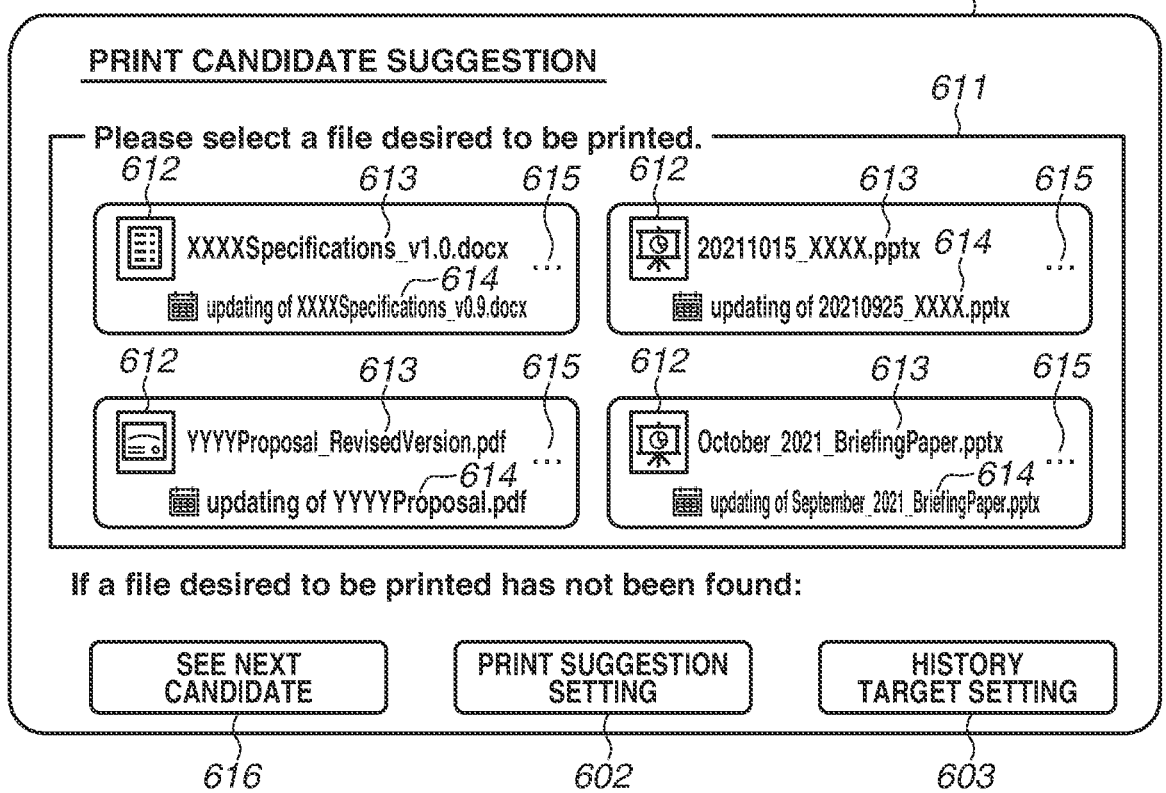

FIGS. 6A and 6B each illustrate an example of a screen that the notification application 300 displays to the user, and which is displayed on the display 208 of the PC 101. A print suggestion screen can be displayed as a pop-up screen on the PC 101, or can be displayed as one notification of a chat application or collaboration tool that runs on the PC 101. Thus, the notification application 300 can be a chat application, and, in a case where a candidate for print data (image data) is communicated to the chat application, the candidate for print data is displayed in a talk room of the chat application. In a case where a candidate for print data is communicated to a chat application installed on the PC 101, the candidate for print data is transmitted to a chat server that provides a chat service. Then, the chat server transmits, to the chat application of the PC 101, information about a talk room in which the candidate for print data has been posted.

FIG. 6A illustrates an example of a screen via which the user makes a print suggestion request, so that, via the screen, the user can issue instructions for a request for print suggestion and for transition to a setting screen concerning the print suggestion. A print suggestion request screen 600 is configured with a suggestion request button 601, a print suggestion setting button 602, and a history target setting button 603. The suggestion request button 601 is a button used to issue an instruction for a request for print suggestion to the suggestion service 310 via the notification application 300. The print suggestion setting button 602 is a button used to issue an instruction for setting of a print suggestion to the notification application 300. The history target setting button 603 is a button used to issue an instruction for setting of a history target to the notification application 300. Setting of a print suggestion and setting of a history target are described in detail below with reference to FIGS. 10A and 10B.

FIG. 6B illustrates an example of a print suggestion screen for notifying the user of a print suggestion. A print suggestion screen 610 is configured with a print suggestion display region 611, a plurality of pieces of print suggestion file information 612 included in the print suggestion display region 611, a "see next candidate" button 616, a print suggestion setting button 602, and a history target setting button 603. The print suggestion display region 611 is a region for displaying print suggestion file information 612, and the number of pieces of print suggestion file information 612 to be displayed is determined based on the print suggestion data communicated in step S412. Here, an example in which four pieces of print suggestion file information 612 are displayed is illustrated. The print suggestion file information 612 is one region that is displayed with respect to one file to be communicated as a print suggestion, and is configured with a file name 613 subjected to print suggestion, suggestion information 614, and a file operation button 615. The file name 613 and the suggestion information 614 are displayed based on information about print suggestion data. The file operation button 615 is a button that is to be selected when the user wants to perform an operation on a target file, and can be used to issue an instruction for acquiring a file, opening a file, or printing a file as an operation to be performed on the target file. The "see next candidate" button 616 is a button that is used to issue an instruction for seeing a next candidate to the notification application 300 when the user wants to see a print suggestion for other than the files displayed in the print suggestion display region 611. The print suggestion setting button 602 and the history target setting button 603 operate in the manners equivalent to those in the print suggestion request screen.

FIG. 7 is a diagram illustrating an example of a data structure of the print suggestion data. The print suggestion data 700 is the one in which a notification content of a single print suggestion is written with one data structure. While an example in which the data stricture is output with the JavaScript Object Notation (JSON) format is illustrated, the output format is not limited as long as one notification is represented by one data structure. The print suggestion data 700 is configured with basic information 701 and print suggestion information 702. The basic information 701 includes the type of main data and the transmission date and time of data. The print suggestion information 702 includes the number of files written as print suggestions and the ID, name, format, location, and reason for setting as a print candidate of each file displayed as a print suggestion. With regard to information about files as print suggestion information, a plurality of print candidates can be registered in a list, so that a number of pieces of print suggestion information corresponding to the number of files are registered. In a case where four pieces of print suggestion information are stored, four documents are displayed as in the image illustrated in FIG. 6B. The number of print suggestions can be set to any optional number, the number of print suggestions can be changed depending on an estimation result of print candidates in the suggestion service 310, and, the number of print candidates to be communicated with one notification by the user can be set.

Figure 8:
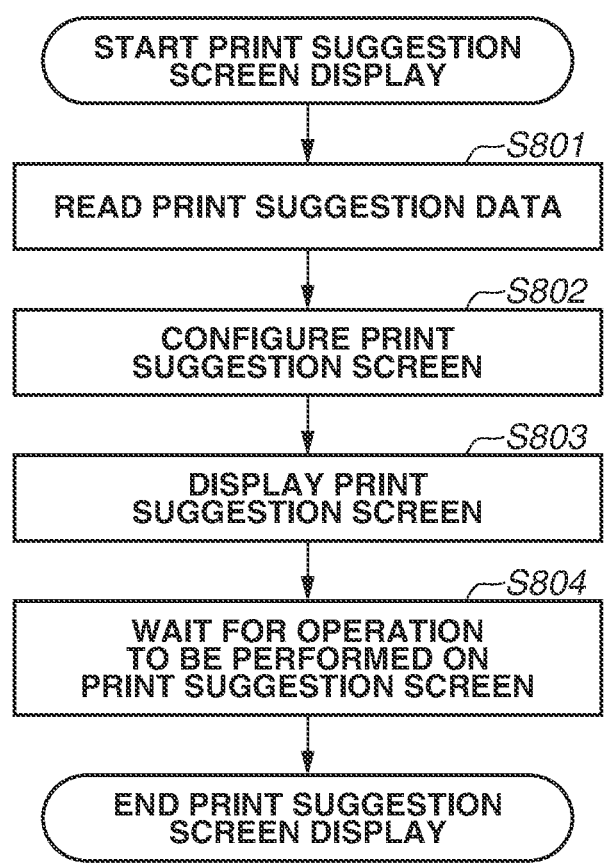
FIG. 8 is a flowchart illustrating processing for controlling displaying of a print suggestion screen.

FIG. 8 is a flowchart illustrating processing for print suggestion screen display that is performed in step S413 illustrated in FIG. 4.

This processing is implemented by the CPU 201 included in the PC 101 executing the notification application 300, which runs by a control program read out from the ROM 202 and loaded onto the RAM 203.

In step S801, the notification application 300 reads out, from the RAM 203, print suggestion data received from the suggestion service 310, and then advances the processing to step S802.

In step S802, the notification application 300 reads print suggestion information 702 required for a print suggestion screen from the print suggestion data. Then, the notification application 300 configures a print suggestion screen 610 based on the read print suggestion information 702, records data about the configured print suggestion screen 610 in a region of the RAM 203 used for displaying by the notification application 300, and then advances the processing to step S803.

In step S803, the notification application 300 causes the display 208 to display the print suggestion screen 610 configured on the RAM 203 via the screen output unit 206, and then advances the processing to step S804.

In step S804, the notification application 300 waits for receiving an operation that is performed by the user on the print suggestion screen 610 via the operation input unit 207, and then ends the processing in the present flowchart.

FIG. 9 is a diagram illustrating a sequence that occurs when, after the print suggestion screen 610 illustrated in FIG. 6B is displayed to the user in step S413 illustrated in FIG. 4, an operation performed by the user has been received.

The sequence starts with the notification application 300 on the PC 101 displaying the print suggestion screen 610 in step S413. In the present sequence, operations that are performed when the user has selected the "see next candidate" button 616 in the print suggestion screen 610 are illustrated as steps S901 to S906.

In step S901, the notification application 300 receives an operation performed by the user via the operation input unit 207. The notification application 300 determines the received operation via the reception unit 305, determines that an instruction to the "see next candidate" button 616 has been received, and then advances the processing to step S902.

In step S902, the notification application 300 transmits an instruction for seeing a next print candidate to the suggestion service 310. The suggestion service 310 receives the instruction for seeing a next print candidate, and then advances the processing to step S903.

In step S903, the suggestion service 310 performs processing for determining a next print suggestion list. The suggestion service 310 excludes, from the estimation result list stored in step S510, items selected as the print suggestion list. Then, the suggestion service 310 acquires, from a remainder obtained by such exclusion, a predetermined number of items the priority of which in the estimation result list is higher in order, thus creates a next print suggestion list, stores the next print suggestion list in the RAM 213, and then advances the processing to step S904.

In step S904, the suggestion service 310 generates print suggestion data with use of the next print suggestion list stored in step S903, and then advances the processing to step S905.

In step S905, the suggestion service 310 transmits the next print suggestion data to the notification application 300, and then advances the processing to step S906.

In step S906, the notification application 300 displays a print suggestion screen 610 based on the received next print suggestion data. Here, the print suggestion screen display processing described above with reference to FIG. 8 is performed.

In the sequence performed up to this point, an operation of receiving a notification of print suggestion and requesting a next print suggestion that is not included in the received suggestion is illustrated. After this, selecting the "see next candidate" button 616 again enables repeating processing operations starting with step S901 and additionally requesting a next print suggestion.

Next, operations that are performed when the user has issued an instruction for printing via the file operation button 615 of the specific print suggestion file information 612 in the print suggestion screen 610 are illustrated as steps S907 to S911.

In step S907, the notification application 300 receives a print instruction for a print suggestion file from the user via the operation input unit 207. The notification application 300 determines that the print instruction has been received via the reception unit 305, and then advances the processing to step S908.

In step S908, the notification application 300 instructs the suggestion service 310 to perform print execution of a target file. Upon receiving the print execution instruction, the suggestion service 310 advances the processing to step S909.

In step S909, the suggestion service 310 searches for a file subjected to the print execution instruction from the print candidate file list, and then records print execution completion information. Then, the suggestion service 310 specifies, based on file information about the file subjected to the print execution instruction, the location of the file on the file server 320, records the location of the file on the RAM 213, and then advances the processing to step S910.

In step S910, the suggestion service 310 designates the location of a target file, issues an instruction for printing to the multifunction peripheral 103, and then advances the processing to step S911.

In step S911, the multifunction peripheral 103 receives a file print instruction, acquires a target file from the file server 320, performs printing, and then ends the processing in the present sequence.

Here, since issuing an instruction for printing via the notification application 300 enables preserving the records of printing in a print candidate list on the suggestion service 310, it becomes possible to determine the degree of priority based on the recorded information.

Next, operations that are performed when the user has issued an instruction for seeing a related file via the file operation button 615 of the specific print suggestion file information 612 in the print suggestion screen 610 are illustrated as steps S912 to S914 and steps S904 to S906. In steps S904 to S906, operations similar to the above-described operations in the sequence for seeing a next candidate are performed.

In step S912, the notification application 300 receives an operation performed by the user via the operation input unit 207. The notification application 300 determines the received operation via the reception unit 305, determines that an instruction for seeing a related file has been received, and then advances the processing to step S913.

In step S913, the notification application 300 transmits an instruction for seeing a related file to the suggestion service 310. The suggestion service 310 receives the instruction for seeing a related file, and then advances the processing to step S914.

In step S914, the suggestion service 310 performs processing for determining a list of related files for the designated file. The suggestion service 310 acquires a related file list for the designated file included in the related file list stored in step S505. Then, the suggestion service 310 acquires, from a related file list written subsequent to the designated file, a predetermined number of items the priority of which is higher in order, thus creates a print suggestion list concerning related files, stores the print suggestion list in the RAM 213, and then advances the processing to step S904.

In steps S904 to S906, as with the operations in the sequence for seeing a next candidate, operations in which the suggestion service 310 creates print suggestion data based on the print suggestion list and transmits the print suggestion data to the notification application 300 and the notification application 300 displays a print suggestion screen are performed.

Here, it is possible to receive, via the notification application 300, a print suggestion concerning files that the suggestion service 310 has collected as similar files at the time of estimation.

FIGS. 10A and 10B illustrate examples of setting screens concerning a print suggestion in the first exemplary embodiment, each of which is displayed on the display 208. The control unit 302 of the notification application 300 stores the set items in the HDD 204 of the PC 101, notifies the suggestion service 310 of the set items via the notification unit 303, and also additionally registers the user who has performed setting.

FIG. 10A illustrates an example of a setting screen for print suggestion, which the notification application 300 displays and via which the user can issue an instruction for setting of a print suggestion.

A setting screen for print suggestion 1000 is configured with a similar file determination 1001, which includes setting items of similar file determination, a cancel button 1015, and an OK button 1016. The similar file determination 1001 is configured with setting items including a numerical notation priority determination setting 1002, a same format priority setting 1005, a set character string priority setting 1008, and a similar candidate assemblage setting 1012. The respective setting items of the similar file determination 1001 are provided with ON buttons 1003, 1006, 1009, and 1013 and OFF buttons 1004, 1007, 1010, and 1014 for settings, so that each of the setting items can be switched between being enabled and being disabled. The set character string priority setting 1008 is provided with a character string setting 1011, so that a character string to be prioritized can be set from the character string setting 1011. If the OK button 1016 is selected, the notification application 300 stores, as a setting value, setting of a print suggestion set in the screen in the HDD 204, and notifies the suggestion service 310 of the setting content and the user who has performed setting in combination. If the cancel button 1015 is selected, the notification application 300 ends the setting screen for print suggestion without storing the settings on the screen.

FIG. 10B illustrates an example of a print history target selection screen, which the notification application 300 displays and via which the user can issue an instruction for target selection setting of a print history.

The print history target selection screen 1017 is configured with a target period setting 1018, a similar history assemblage setting 1020, a print history target selection setting 1023, a cancel button 1028, and an OK button 1029.

The target period setting 1018 can set, via a setting field for period setting 1019, up to what days ago to use print histories for use in estimation of a print suggestion. The similar history assemblage setting 1020 is provided with an ON button 1021 and an OFF button 1022 for settings, so that selecting one of the ON button 1021 and the OFF button 1022 enables setting enabling or disabling of the similar history assemblage setting.

The print history target selection setting 1023 displays print histories of the user for the period selected in the period setting 1019, and, for each print history, it is possible to set whether to enable or disable the print history as a target for print suggestion. Each history displays an enabling setting 1024 and the date and time of printing 1025, file name 1026, and printed page count 1027 as information about the print history. With regard to the enabling setting 1024, in the case of performing setting for an individual history, a checkbox of the enabling setting 1024 of each item can be selected for switching, and, in the case of enabling all of the items, checkboxes of the enabling setting 1024 of all of the items are able to be selected for collective setting. While, here, the date and time of printing, file name, and printed page count are displayed as information about a print history, this is not seen to be limiting. In another exemplary embodiment, items able to be acquired as a file attribute or information about print settings can be displayed as information about a print history.

If the OK button 1029 is selected, the notification application 300 stores, as a setting value, a print history target selection setting set in the screen in the HDD 204, and notifies the suggestion service 310 of the setting content and the user that has performed setting in combination. If the cancel button 1028 is selected, the notification application 300 ends the setting screen for print suggestion without storing the settings on the screen.

Figure 11A:
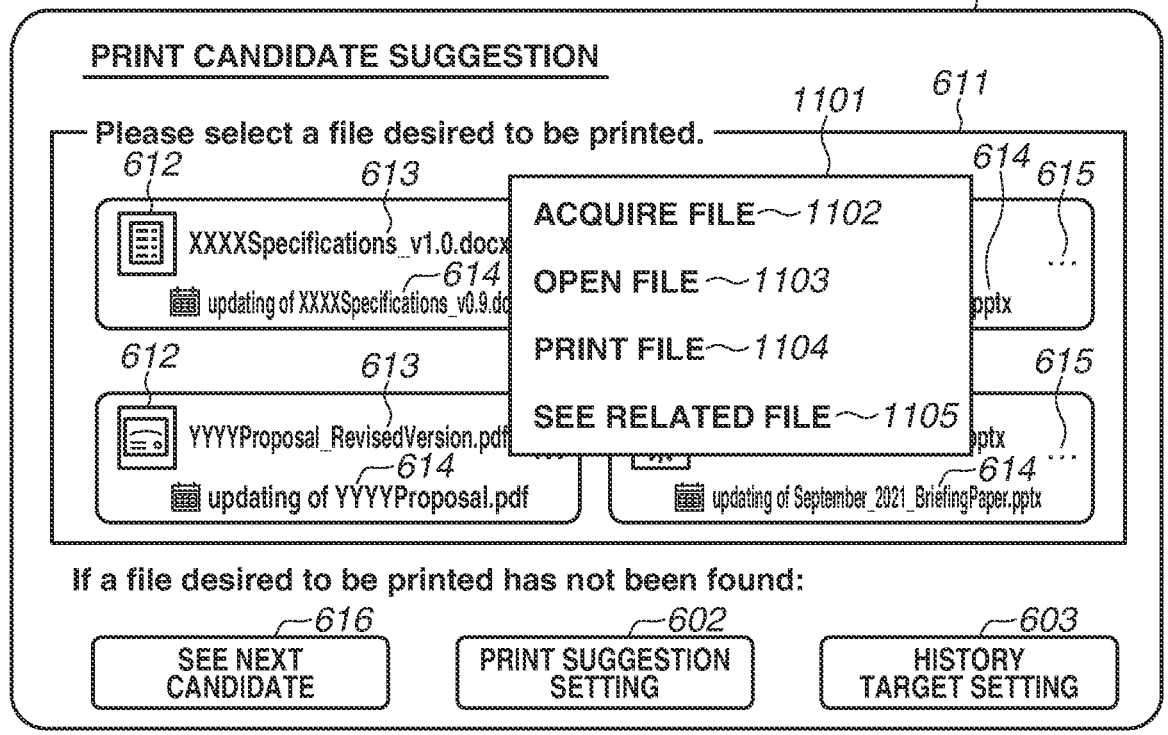
FIGS. 11A and 11B are diagrams illustrating examples of a screen for suggesting related files for print suggestion.
Figure 11B:
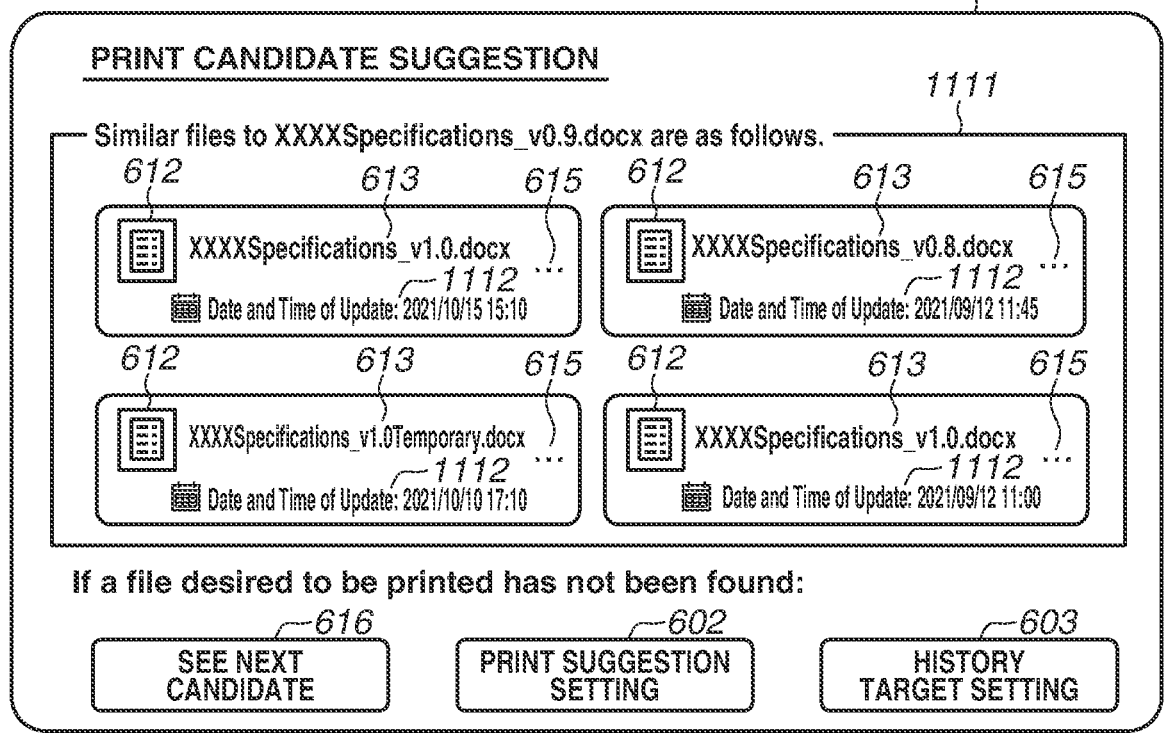

FIGS. 11A and 11B each illustrate an example of a screen that the notification application 300 displays upon receiving an operation performed by the user on the displayed print suggestion screen 610, and which is displayed on the display 208 of the PC 101. A print suggestion screen can be displayed as a pop-up screen on the PC 101, or can be displayed as one notification of a chat application or collaboration tool that runs on the PC 101.

FIG. 11A illustrates an example of a file operation designation screen 1100 that the notification application 300 displays in a case where the file operation button 615 has been selected in the print suggestion screen 610.

In a case where the file operation button 615 has been selected, the notification application 300 displays a file operation instruction 1101. The file operation instruction 1101 includes an "acquire file" button 1102, an "open file" button 1103, a "print file" button 1104, and a "see related file" button 1105, each of which is used to issue an instruction for file manipulation. In a case where the "acquire file" button 1102 has been selected as an instruction, the notification application 300 acquires file location information from the print suggestion file information 612 about the selected file and thus acquires the file from the file server 320. In a case where the "open file" button 1103 has been selected as an instruction, the notification application 300 acquires file location information from the print suggestion file information 612 about the selected file, acquires the file from the file server 320, and thus opens the file. In a case where the "print file" button 1104 has been selected as an instruction, the notification application 300 causes the above-mentioned processing operations in steps S907 to S911 to be performed and thus causes printing of the selected file to be performed. In a case where the "see related file" button 1105 has been selected as an instruction, the notification application 300 causes the above-mentioned processing operations in steps S912 to S906 to be performed, thus acquires related files from the similar file list including the selected file, and displays a suggestion screen for related files 1110.

FIG. 11B illustrates an example of a suggestion screen for related files 1110 that the notification application 300 displays in a case where the "see related file" button 1105 has been selected. In the suggestion screen for related files 1110, items having the same configurations as those of the print suggestion screen 610 are omitted from description. The suggestion screen for related files 1110 includes a related file display region 1111, in which file information related to a file with respect to which the "see related file" button 1105 has been selected as an instruction is displayed as print suggestion file information 612, and buttons equivalent to those in the print suggestion screen 610. The print suggestion file information 612 includes related file reason information 1112 in which a reason for being selected as a related file is written.

Figure 12:
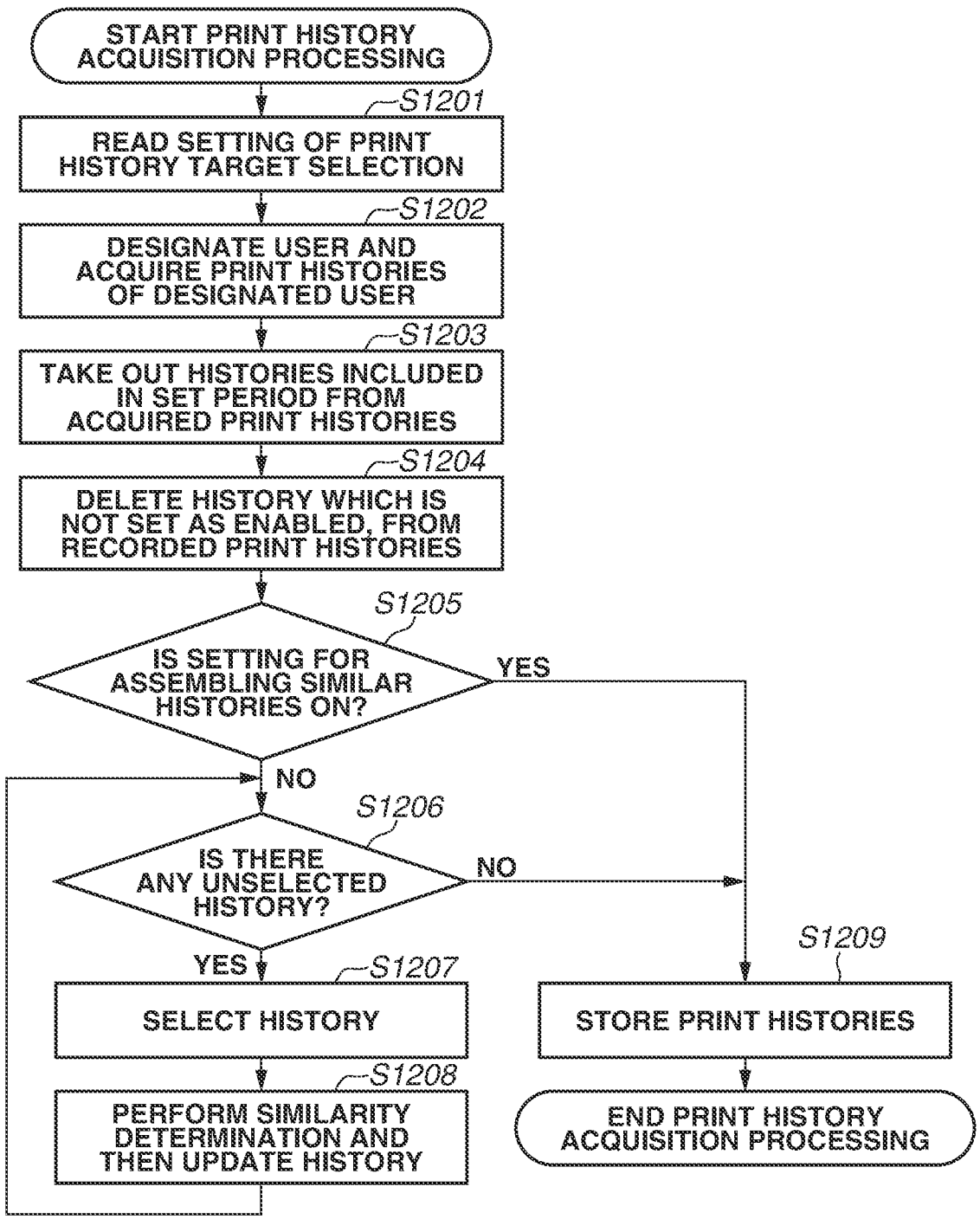
FIG. 12 is a flowchart illustrating the flow of print history acquisition processing.

FIG. 12 is a flowchart illustrating print history acquisition processing that is performed in step S502 illustrated in FIG. 5 in the first exemplary embodiment. A series of processing operations in the present flowchart is performed by the CPU 211 included in the application server 102 executing the suggestion service 310, which runs by a control program read out from the ROM 212 and loaded onto the RAM 213.

In step S1201, the suggestion service 310 reads the setting of print history target selection that has been set via the print history target selection screen 1017 and has been stored, and then advances the processing to step S1202.

In step S1202, the suggestion service 310 designates a user who has requested a print suggestion from the file server 320 and acquires print histories of the designated user. The suggestion service 310 records the acquired print histories on the RAM 213, and then advances the processing to step S1203.

In step S1203, the suggestion service 310 reads out a period that is set in the target period setting 1018 of the print history target selection setting read in step S1201, takes out only histories included in the read-out period from the print histories acquired in step S1202, and then updates the print histories. Then, the suggestion service 310 records the updated print histories on the RAM 213, and then advances the processing to step S1204.

In step S1204, the suggestion service 310 acquires the enabling setting 1024 of a print history target of the print history target selection setting read in step S1201, and specifies a print history that is not set as enabled. Then, the suggestion service 310 deletes the print history that is not set as enabled from the print histories recorded in step S1203. The suggestion service 310 records the updated print histories on the RAM 213, and then advances the processing to step S1205.

In step S1205, the suggestion service 310 acquires the similar history assemblage setting 1020 of the print history target selection setting read in step S1201, and, if the similar history assemblage setting 1020 is ON (YES in step S1205), the suggestion service 310 advances the processing to step S1209 and, if the similar history assemblage setting 1020 is OFF (NO in step S1205), the suggestion service 310 advances the processing to step S1206.

In step S1206, the suggestion service 310 reads out the print histories recorded on the RAM 213 and determines whether there is any unselected history in the print histories. If it is determined that there is an unselected history (YES in step S1206), the suggestion service 310 advances the processing to step S1207, and, if it is determined that there is no unselected history (NO in step S1206), the suggestion service 310 advances the processing to step S1209.

In step S1207, the suggestion service 310 selects a history the date and time of printing of which is latest in the unselected histories from the print histories, and then advances the processing to step S1208.

In step S1208, the suggestion service 310 reads out the selected print history and searches for a print history the file name of which is similar to the file name of the selected print history from the unselected print histories.

In a case where a print history the file name of which is similar to the file name of the selected print history has been found from the unselected print histories, the suggestion service 310 records the number of found print histories similar in file name as the number of histories similar to the selected print history, sets the print histories similar in file name as selected print histories, and records the selected print histories as the print histories. After updating and recording the print histories on the RAM 213, the suggestion service 310 returns the processing to step S1206. Here, an example of determining whether there is a similarity in file name is described. In a case where the file name of the selected print history is "XXXX_20200305.pptx", the suggestion service 310 determines that "20200305" in the posterior half is a character string indicating a date and specific portions are "XXXX" and "pptx". Thus, the suggestion service 310 determines that, for example, "XXXX 20200312.pptx" or "XXXX 20201005.pptx" is a similar file in the print histories. While, here, an example of determination processing for a similar file has been described, in another exemplary embodiment, the suggestion service 310 can perform processing equivalent to priority determination processing that is performed in similar file priority determination processing illustrated in FIG. 13.

In step S1209, the suggestion service 310 stores, in the HDD 214, the print histories, which have been recorded on the RAM 213, as print histories subjected to history selection processing by the print history selection setting, and then ends the processing in the present flowchart.

The processing in the present flowchart enables selecting a history in which the setting by the user has been reflected, from among the print histories. With regard to similar print histories, the processing in the present flowchart enables determining, from the histories, information indicating that printing of a similar file has been performed and treating the determined information as information to be used for estimation of a print candidate.

Figure 13:
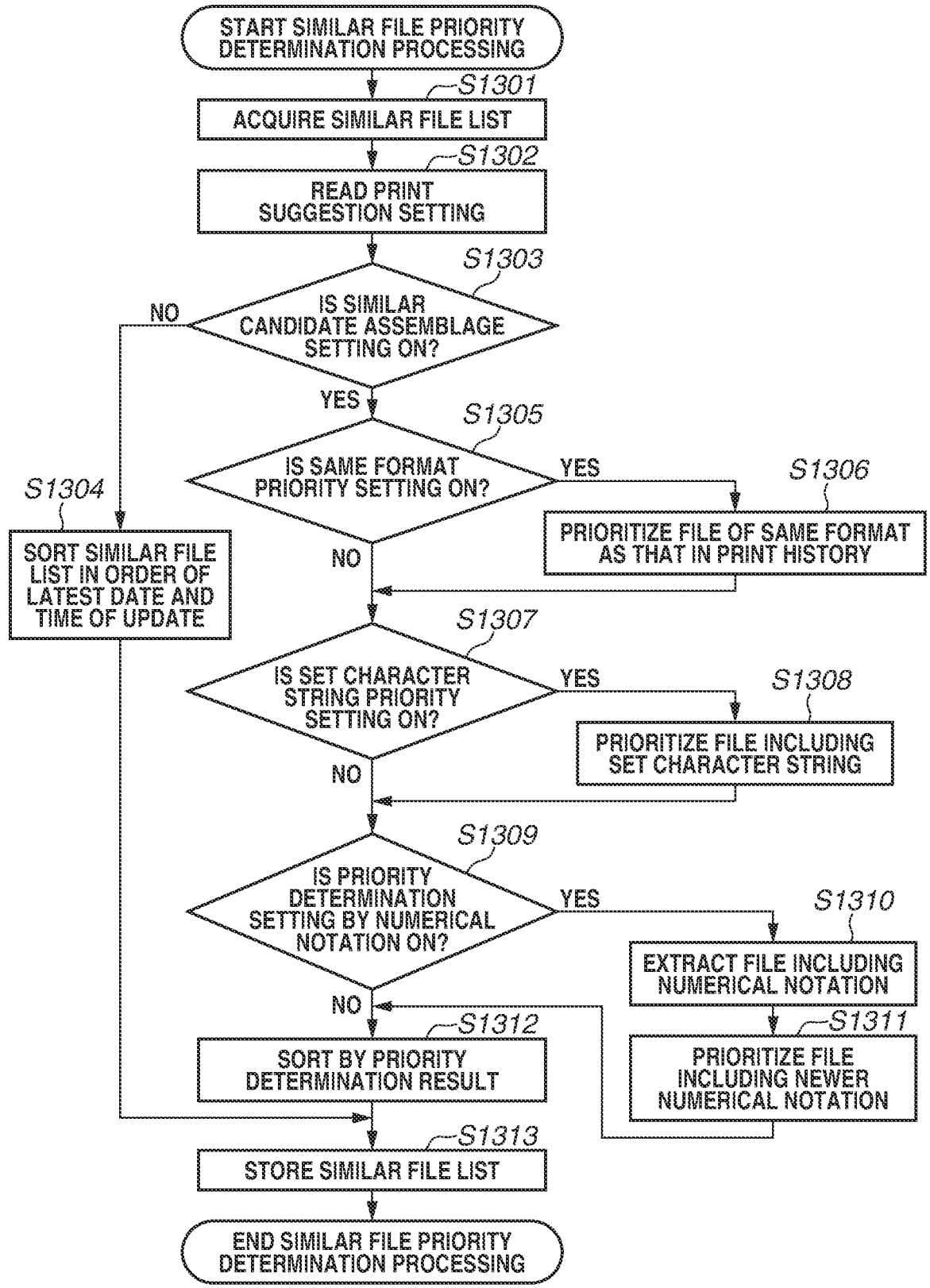
FIG. 13 is a flowchart illustrating the flow of similar file priority determination processing.

FIG. 13 is a flowchart illustrating the similar file priority determination processing that is performed in step S506 illustrated in FIG. 5 in the first exemplary embodiment. A series of processing operations in the present flowchart is performed by the CPU 211 included in the application server 102 executing the suggestion service 310, which runs by a control program read out from the ROM 212 and loaded onto the RAM 213.

In step S1301, the suggestion service 310 acquires a similar file list recorded on the RAM 213, and then advances the processing to step S1302.

In step S1302, the suggestion service 310 reads setting of a print suggestion that has been set and stored from the setting screen for print suggestion 1000, and then advances the processing to step S1303.

In step S1303, the suggestion service 310 determines whether the similar candidate assemblage setting of the print suggestion setting read in step S1302 is set ON. If it is determined that the similar candidate assemblage setting is set ON (YES in step S1303), the suggestion service 310 advances the processing to step S1305, and, if it is determined that the similar candidate assemblage setting is set OFF (NO in step S1303), the suggestion service 310 advances the processing to step S1304.

In step S1304, the suggestion service 310 determines not to perform similar candidate assemblage processing, sorts the similar file list read in step S1301 in order of the latest date and time of file update, and then advances the processing to step S1313.

In step S1305, the suggestion service 310 determines whether the same format priority setting of the print suggestion setting read in step S1302 is set ON. If it is determined that the same format priority setting is set ON (YES in step S1305), the suggestion service 310 advances the processing to step S1306, and, if it is determined that the same format priority setting is set OFF (NO in step S1305), the suggestion service 310 advances the processing to step S1307.

In step S1306, the suggestion service 310 determines whether a file included in the similar file list has the same file format as that in the print history selected in step S504, records setting of prioritizing a file of the same format with respect to the file determined to have the same format, and then advances the processing to step S1307.

In step S1307, the suggestion service 310 determines whether the set character string priority setting of the print suggestion setting read in step S1302 is set ON. If it is determined that the set character string priority setting is set ON (YES in step S1307), the suggestion service 310 advances the processing to step S1308, and, if it is determined that the set character string priority setting is set OFF (NO in step S1307), the suggestion service 310 advances the processing to step S1309.

In step S1308, the suggestion service 310 acquires the value of a character string set in the setting of a set character string of the print suggestion setting read in step S1302.

Then, the suggestion service 310 determines whether a file including the set character string exists in the similar file list, records setting of prioritizing a set character string with respect to the file including the set character string, and then advances the processing to step S1309.

In step S1309, the suggestion service 310 determines whether the numerical notation priority determination setting of the print suggestion setting read in step S1302 is set ON. If it is determined that the numerical notation priority determination setting is set ON (YES in step S1309), the suggestion service 310 advances the processing to step S1310, and, if it is determined that the numerical notation priority determination setting is set OFF (NO in step S1309), the suggestion service 310 advances the processing to step S1312.

In step S1310, the suggestion service 310 determines whether the file name of a file included in the similar file list is that of a file including a numerical notation, extracting the file including a numerical notation, and then advances the processing to step S1311.

In step S1311, the suggestion service 310 records setting of selecting and prioritizing a file including a newer numerical notation out of the files extracted in step S1310, and then advances the processing to step S1312. For example, suppose a case where "XXXX_20211005.pptx" and "XXXX_20210312.pptx" have been extracted as files including a numerical notation. Since, at this time, the written numerical notation is a year-month-day format, the suggestion service 310 selects "XXXX_20211005.pptx", which has a newer date, as a priority file.

In step S1312, the suggestion service 310 sorts the similar file list by the order in which the number of priority settings is larger, based on the priority settings set as processing results in steps S1306, S1308, and S1311. Then, the suggestion service 310 records the similar file list subjected to sorting on the RAM 213, and then advances the processing to step S1313. Here, in a case where a file equal in the number of priority settings exists, the suggestion service 310 is assumed to perform sorting based on the date and time of file update. Here, with regard to sorting that is based on priority settings, the suggestion service 310 can perform ordering of priority settings and perform sorting in such a manner that a priority setting higher in order is set higher-order.

In step S1313, the suggestion service 310 records the similar file list, which has been recorded on the RAM 213, as a result of priority determination processing on the HDD 214, and then ends the processing in the present flowchart. Performing the processing in the present flowchart enables recording a file recorded at the head of the stored similar file list as a file to be prioritized out of similar files.

With the above-described operations of the printing system, when wanting to receive a print suggestion, the user issues a print suggestion request instruction to the printing system, thus being able to receive a notification of a print candidate list and determine whether to perform printing based on the content of the notification. This enables reducing the user's trouble of, when searching for an information material to be printed, searching for a storage location of the information material.

In the present exemplary embodiment, when a request for print suggestion has been made, a print candidate is estimated based on a print history of the user and is then communicated to the notification application 300 on a PC that the user uses. However, there may be instances where a document that the user sets as a print candidate is not always the one associated with a print history. This can result in taking time to search for a document that has not been previously printed since it is not being suggested as a print candidate.

In a second exemplary embodiment, control operations for estimating a print candidate with use of additional information, such as a schedule that a schedule management service other than a file server manages, the location of a file on a file server, or an operation or update history of a file, are described.

In the second exemplary embodiment, portions that are not particularly described, such as a network configuration, a hardware configuration of an information processing apparatus, and a software configuration thereof, are the same as those in the first exemplary embodiment.

Figure 14:
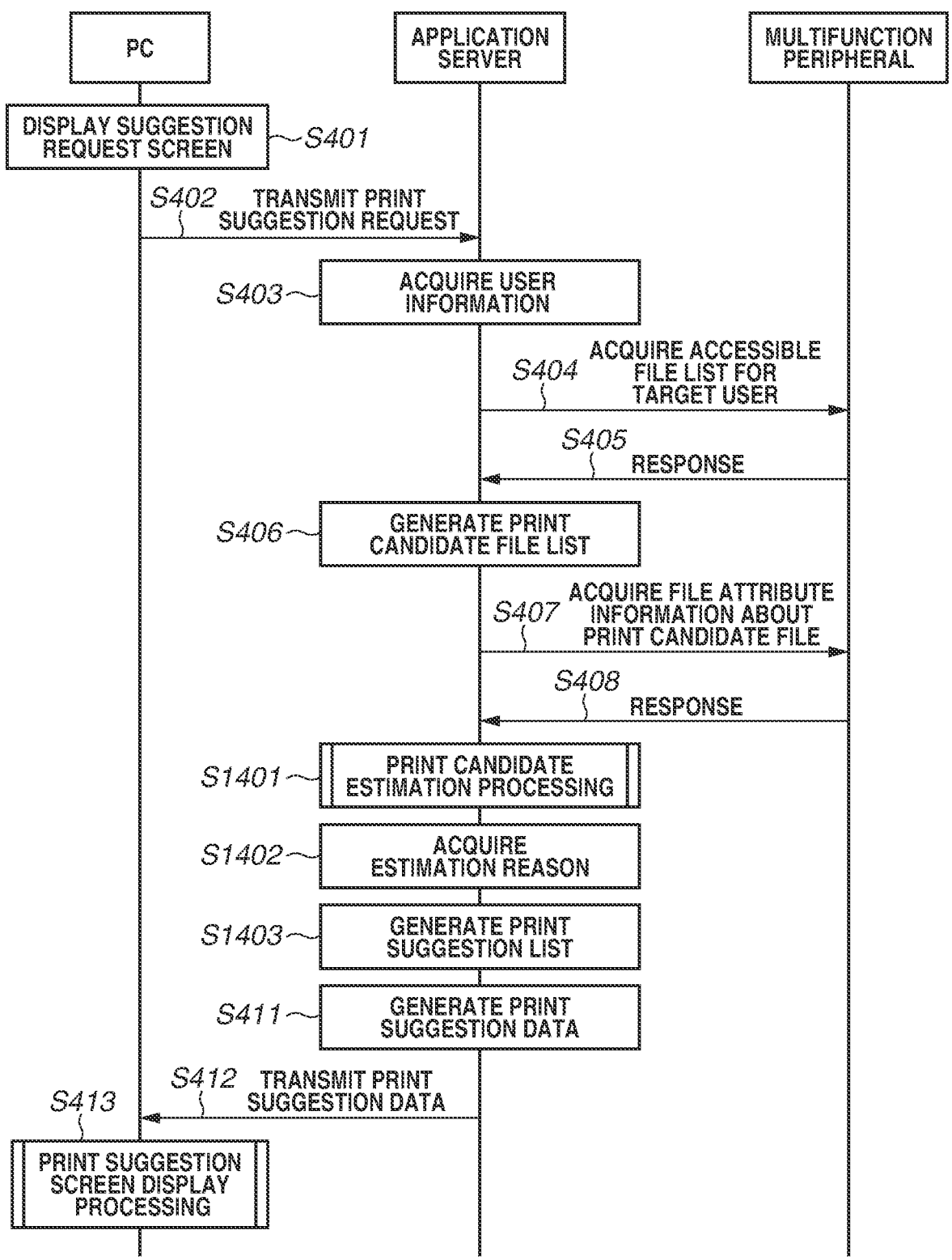
FIG. 14 is a sequence diagram illustrating the flow of notification processing for print suggestion in a second exemplary embodiment.

FIG. 14 is a sequence diagram illustrating the flow of overall processing in which, in the printing system according to the second exemplary embodiment, the suggestion service 310 determines timing of a notification, estimates a print candidate, and then displays a print suggestion screen in the PC.

In the second exemplary embodiment, the printing system is assumed to have a configuration similar to that illustrated in FIG. 1 in the first exemplary embodiment, and each service is assumed to run in the applicable equivalent apparatus. A series of processing operations in the present sequence is performed by the PC 101, application server 102, and the multifunction peripheral 103 of the printing system. Processing operations on the PC 101 are performed by the notification application 300, which runs by a control program read out from the ROM 202 and loaded onto the RAM 203 by the CPU 201 included in the PC 101. Processing operations on an application server are performed by the suggestion service 310 and the schedule management service 330, which run by a control program read out from the ROM 212 and loaded onto the RAM 213 by the CPU 211 included in the application server 102. Processing operations on a multifunction peripheral are performed by the file server 320, which runs by a control program read out from the ROM 217 and loaded onto the RAM 218 by the CPU 216 included in the multifunction peripheral 103.

The sequence is started with the notification application 300 on the PC 101 performing determination of a print suggestion request notification issued by the user. In steps S401 to S408, the notification application 300, the notification application 300, and the file server 320 perform processing operations equivalent to those illustrated in FIG. 4. Upon receiving the response in step S408, the suggestion service 310 advances the processing to step S1401.

In step S1401, the suggestion service 310 performs print candidate estimation processing. In the print candidate estimation processing, the suggestion service 310 executes a plurality of estimation logics for estimating a print candidate. The details of the print candidate estimation processing are described below with reference to FIG. 15. Upon completing the print candidate estimation processing, the suggestion service 310 stores an aggregate list that is a result of such estimation processing in the HDD 214, and then advances the processing to step S1402.

In step S1402, the suggestion service 310 acquires a predetermined number of higher-order items from the aggregate list stored in the HDD 214. Then, the suggestion service 310 performs processing for acquiring, based on an ID and a priority logic of a file included in the predetermined number of higher-order items, a reason for priority of each file from a logic written in the priority logic, records the acquired reason for priority on the RAM 213, and then advances the processing to step S1403. With regard to the reason for priority, the suggestion service 310 determines a logic that is high in priority out of the estimation logics for each print candidate, and determines a candidate determination reason based on the determined logic. For example, in a case where the priority of an estimation logic that is based on a schedule is high, the suggestion service 310 writes a candidate estimation reason such as "10/18 15:00 an information material for meeting A". Additionally, if the priority of an estimation logic for prioritizing a file that was previously printed is high, the suggestion service 310 can write a candidate estimation reason such as "a related file of previously printed BBBB.pptx" based on a previously printed file.

In step S1403, the suggestion service 310 acquires a predetermined number of higher-order items from the aggregate list stored as a result of the print candidate estimation processing performed in step S1401, acquires file information included in the predetermined number of higher-order items from the print candidate file list, and thus generates a print suggestion list. Here, as the reason for priority in the print suggestion list, the suggestion service 310 writes the reason for priority stored in step S1402. The suggestion service 310 stores the generated print suggestion list in the RAM 213, and then advances the processing to step S411. Here, the number of items in the print suggestion list can be changed depending on the number of files in the print candidate file list, or can be a number that is set by the user as the number of items in the print suggestion list.

In step S411 and subsequent steps, the suggestion service 310 performs processing operations similar to those illustrated in FIG. 4, and then ends the processing in the present flowchart.

Figure 15:
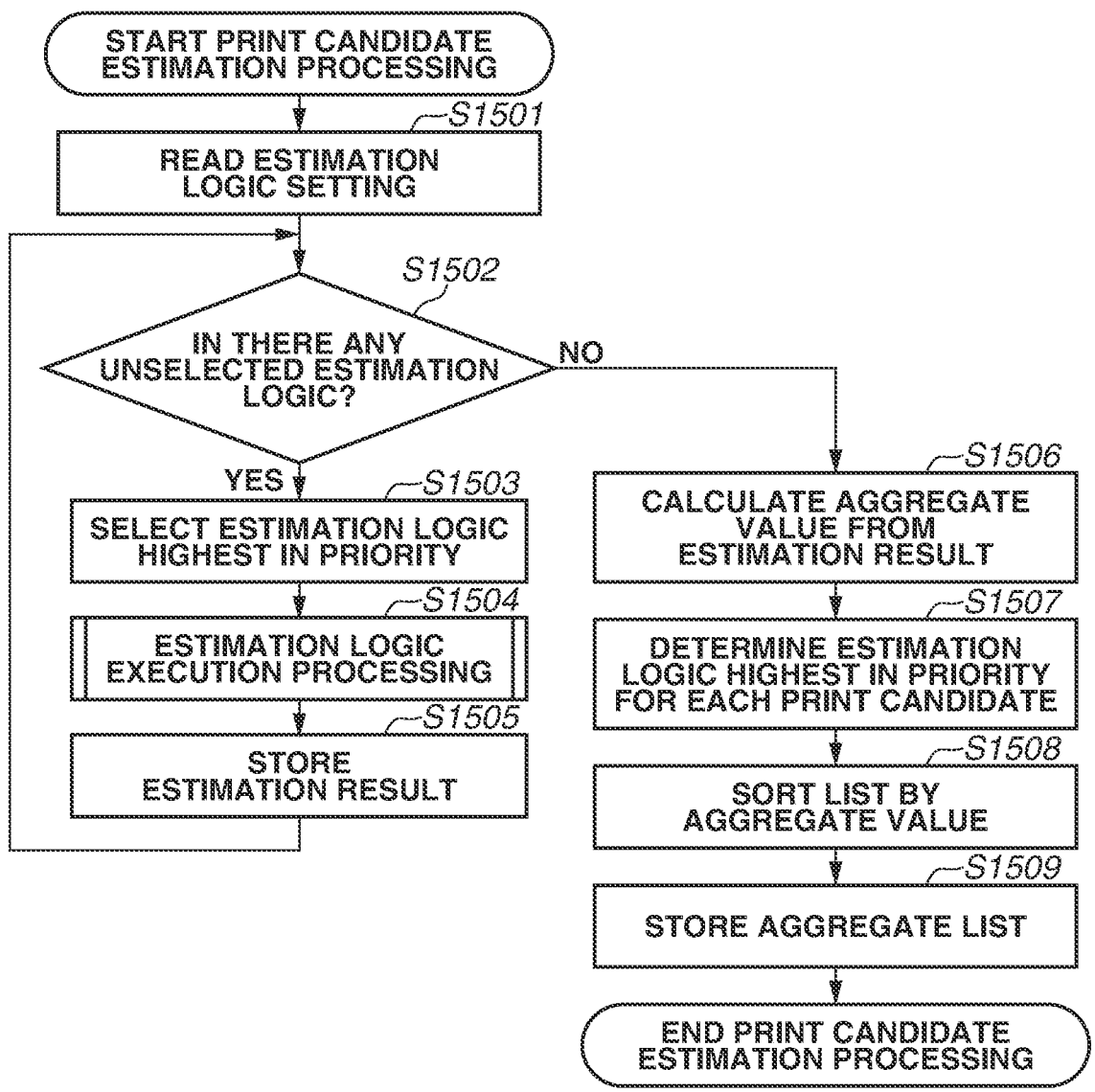
FIG. 15 is a flowchart illustrating the flow of print candidate estimation processing.

FIG. 15 is a flowchart illustrating the print candidate estimation processing performed in step S1401 illustrated in FIG. 14.

The print candidate estimation processing is performed by the suggestion service 310, which runs by a control program read out from the ROM 212 and loaded onto the RAM 213 by the CPU 211 included in the application server 102.

In step S1501, the suggestion service 310 reads out a setting that is set via a setting screen 1600. The setting screen 1600 is described in detail below with reference to FIG. 16. The suggestion service 310 records, on the RAM 213, the contents read out about a list of estimation logics set enabled out of the read-out estimation logic setting and the setting of each estimation logic, and then advances the processing to step S1502.

In step S1502, the suggestion service 310 determines whether there is any unselected estimation logic in the priority logic list recorded on the RAM 213. If it is determined that there is an unselected estimation logic (YES in step S1502), the suggestion service 310 advances the processing to step S1503, and, if it is determined that there is no unselected estimation logic (NO in step S1502), the suggestion service 310 advances the processing to step S1506.

In step S1503, the suggestion service 310 selects one estimation logic that is unselected and is highest in priority from the priority logic list recorded on the RAM 213, and then advances the processing to step S1504.

In step S1504, the suggestion service 310 performs estimation processing for a print candidate with use of the selected estimation logic. With regard to detailed processing for an estimation logic, a partial detailed logic is described below with reference to FIGS. 17A, 17B, 17C, and 17D. The suggestion service 310 acquires an estimation result list created by the estimation logic execution processing, and then advances the processing to step S1505.

In step S1505, the suggestion service 310 records, on the RAM 213, the selected estimation logic and the estimation result list acquired in step S1504 while associating them with each other, and then returns the processing to step S1502.

In step S1506, the suggestion service 310 reads out estimation result lists associated with the respective logics recorded on the RAM 213, and records the read-out estimation result lists in an aggregate list. Then, the suggestion service 310 calculates an aggregate value from the priorities of the respective logics on the aggregate list, and records the calculated aggregate value in the aggregate list. The details of the aggregate list are described below with reference to Table 5. The suggestion service 310 records the aggregate list on the RAM 213, and then advances the processing to step S1507. Here, with regard to aggregate calculation, the suggestion service 310 can obtain an aggregate value by simply adding together the priorities of the respective estimation logics, or can perform aggregate calculation after performing weighting based on the orders of the respective estimation logics.

In step S1507, the suggestion service 310 reads out the aggregate list recorded on the RAM 213, with respect to each file written in the aggregate list, specifies an estimation logic highest in priority of the file, and writes the specified estimation logic as a highest-priority logic. After completing recording of a highest-priority logic for each file, the suggestion service 310 updates the aggregate list, records the updated aggregate list on the RAM 213, and then advances the processing to step S1508.

In step S1508, the suggestion service 310 reads out the aggregate list recorded on the RAM 213, and sorts the aggregate list by the orders that are based on aggregate values in the aggregate list. Here, in a case where aggregate values are the same, the suggestion service 310 is assumed to determine the orders depending on the priority of an estimation logic higher in priority. The order determination method in a case where aggregate values are the same is not limited to this method. In another exemplary embodiment, the suggestion service 310 can determine the orders by performing comparison with use of the smallest value of the priorities of the respective estimation logics of a file, or can determine the orders based on file names. The suggestion service 310 stores, in the RAM 213, the aggregate list sorted by the orders that are based on aggregate values, and then advances the processing to step S1509.

In step S1509, the suggestion service 310 stores the sorted aggregate list in the HDD 214 included in the application server 102, and then ends the processing in the present flowchart.

Table 5 illustrates an example of an aggregate list that is used in the second exemplary embodiment. The aggregate list is configured with the ID of a file serving as a print candidate, the priorities of the respective estimation logics with respect to the file, an aggregate value serving as a total priority obtained by aggregating priorities of the respective estimation logics, and a number of a logic set high in priority out of the estimation logics.

TABLE 5

Aggregate List

| File ID | Logic 1 | Logic 2 | Logic 3 | Logic 4 | Logic 5 | Aggregate Value | Priority Logic |
|---|---|---|---|---|---|---|---|
| 1002 | 8 | 8 | 8 | 8 | 6 | 38 | 1 |
| 1001 | 10 | 6 | 2 | 6 | 8 | 32 | 1 |
| 1003 | 6 | 2 | 10 | 10 | 4 | 32 | 3 |
| 1004 | 4 | 4 | 8 | 4 | 10 | 30 | 5 |
| 1005 | 2 | 10 | 6 | 2 | 2 | 22 | 2 |

Here, an aggregate list obtained in a case where, when five print candidate files exist, five logics are enabled is written. Estimation results of the respective estimation logics are written depending on the orders of priority setting set via the setting screen 1600. Here, with regard to columns of estimation logics, columns of only enabled estimation logics can be written, or ineffective estimation values can be written as estimation results of estimation logics that are not enabled. Priority results of the respective estimation logics in the aggregate list are written by processing performed by the estimation logic selected in step S1503. The priorities to be written here are written after normalizing the priorities determined by the respective estimation logics based on the criterion that the maximum value takes a value of 10, the minimum value takes a value of 1, and the value for a case where a file is not set as a print candidate takes a value of 0. Values can be set based on a criterion different from that of each estimation logic, and aggregate calculation can be performed based on a criterion of each estimation logic at the time of calculating aggregate values. In step S1506, aggregate values are calculated from priority results of the respective estimation logics and are then written. Here, the calculation method for obtaining a sum value is shown. The aggregate list is used to determine a file to be selected as a print candidate based on the aggregate values. In this example, since the aggregate value of the file ID "1002" is "38", which is the maximum value, a file of file ID "1002" can be determined as a file to be most prioritized as a print candidate. With regard to files of file ID "1001" and file ID "1003" that have the next larger and same aggregate value "32", the orders can be determined in such a manner that the file of file ID "1001" is prioritized and the file of file ID "1003" is next prioritized, based on the estimation values of a logic 1, which is higher in priority order of the estimation logic. With regard to a number of the priority logic, an estimation logic determined to be highest in priority as a result of comparison between the priorities of the respective estimation logics for each file is written as the priority logic. In the case of the file of file ID "1001", the logic 1, in which the priority "10" is set, is selected as the priority logic. In a case where the priorities of the respective estimation logics are the same, such as the file of file ID "1002", a logic which is higher in the priority order of the estimation logic is selected. Selection of the priority logic is not limited to this processing, and in another exemplary embodiment, the priority logic can be determined based on the priority order of the estimation logic. In still yet another exemplary embodiment, a plurality of logics can be preliminarily registered as the priority logic.

Figure 16:
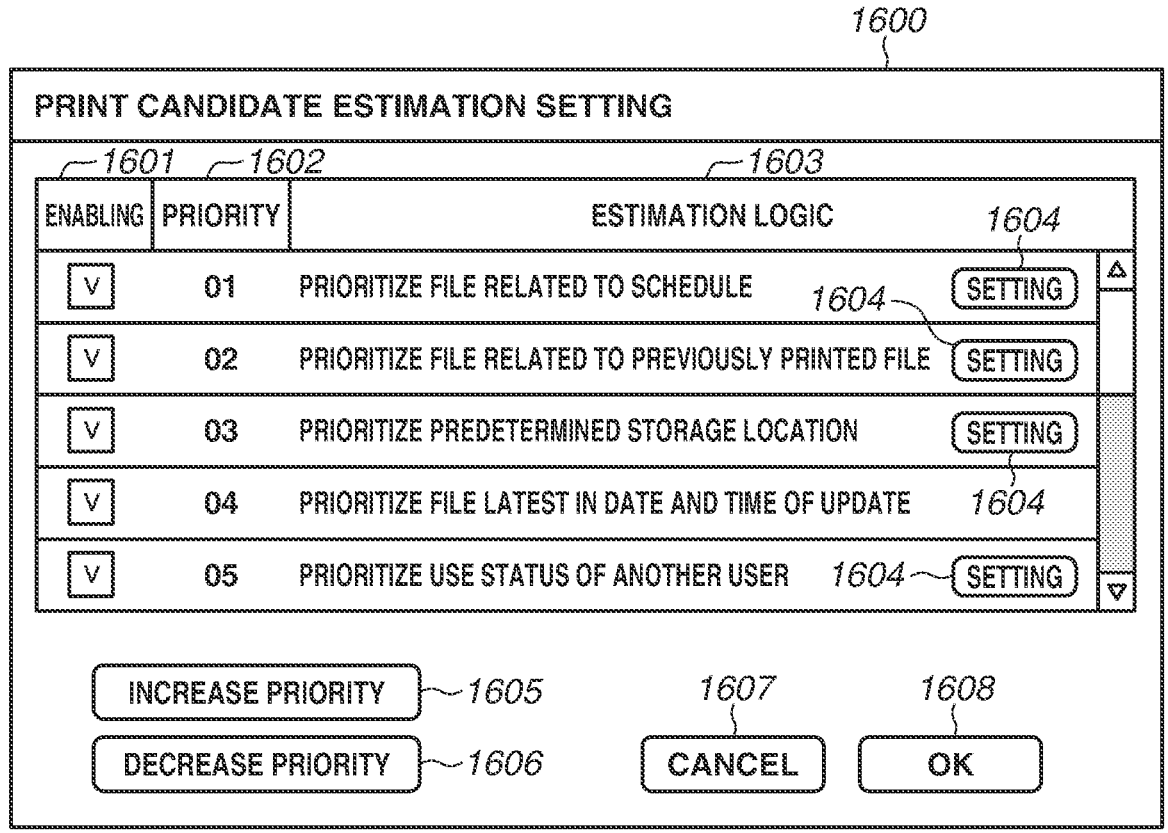
FIG. 16 is a diagram illustrating an example of a print candidate estimation setting screen.

FIG. 16 illustrates an example of a screen for print candidate estimation setting, which is displayed on the display 208. With regard to setting of print candidate estimation, the control unit 302 of the notification application 300 is assumed to display, as an initial value, a setting value read out from the HDD 204 included in the PC 101. An operation performed on the setting screen 1600 is assumed to be received from the mouse 210 via the operation input unit 207.

When an enabling button 1601 of the setting screen 1600 is selected, a checkbox is checked to select a logic that is used as an estimation logic for performing a print candidate estimation. A priority indication 1602 indicates the priority order of an estimation logic 1603. The estimation logic 1603 in the second exemplary embodiment includes an estimation that is based on a schedule, an estimation that is based on a print history, an estimation that is based on a predetermined storage location, an estimation that is based on the date and time of update, and an estimation that is based on a use status of another user. In the second exemplary embodiment, when the estimation that is based on a schedule, the estimation that is based on a print history, the estimation that is based on a predetermined storage location, or the estimation that is based on a use status of another user is to be selected, each estimation can be set via a setting button 1604.

When, in a state in which each estimation logic 1603 is selected, a priority increase button 1605 or a priority decrease button 1606 is selected, the priority order of the selected estimation logic is changed.

When an OK button 1608 is selected, the notification application 300 stores a print candidate estimation setting that is set on the screen as a setting value in the HDD 214, and notifies the suggestion service 310 of the content of the print candidate estimation setting and the user who has performed setting. When a cancel button 1607 is selected, the notification application 300 ends the setting screen 1600 without storing the print candidate estimation setting set on the screen.

FIGS. 17A to 17D are flowcharts each illustrating the details of processing for an estimation logic that can be enabled via the print candidate estimation setting. While, here, four estimation processing operations are described, as an equivalent estimation processing operation, the print candidate estimation processing illustrated in FIG. 5 is also able to be performed as one of estimation logics. This processing is performed by the suggestion service 310 and the schedule management service 330, which run by a control program read out from the ROM 212 and loaded onto the RAM 213 by the CPU 211 included in the application server 102.

Figure 17A:
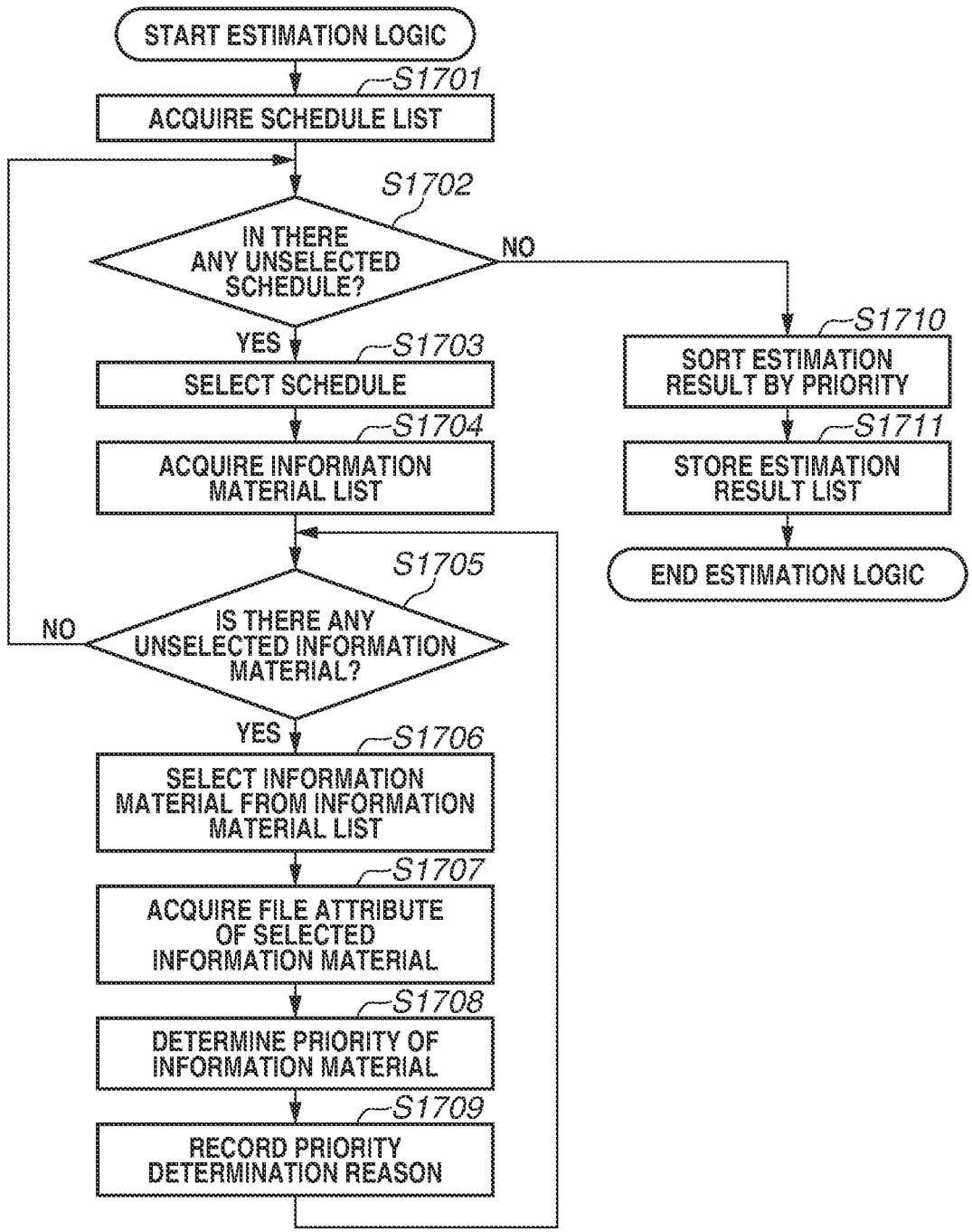
FIGS. 17A, 17B, 17C, and 17D are flowcharts illustrating the flow of processing of an estimation logic.

FIG. 17A is a flowchart illustrating an estimation logic that is based on a schedule, which is one of estimation logic execution processing operations to be performed in step S1504 illustrated in FIG. 15. This processing is performed by the suggestion service 310, which runs by a control program read out from the ROM 212 and loaded onto the RAM 213 by the CPU 211 included in the application server 102.

In step S1701, the suggestion service 310 requests acquisition of a schedule list of the target user from the schedule management service 330. Then, upon receiving the schedule list as a response from the schedule management service 330, the suggestion service 310 records the received schedule list on the RAM 213, and then advances the processing to step S1702. Here, the schedule list to be requested from the schedule management service 330 can be acquired by designating only the user or can be acquired by designating a period such as a schedule within one week of the date of acquisition of the schedule list.

In step S1702, the suggestion service 310 determines whether there is any unselected schedule in the schedule list recorded on the RAM 213. If it is determined that there is an unselected schedule (YES in step S1702), the suggestion service 310 advances the processing to step S1703, and, if it is determined that there is no unselected schedule (NO in step S1702), the suggestion service 310 advances the processing to step S1710.

In step S1703, the suggestion service 310 selects one unselected schedule from schedules the date and time of start of which is closer to the date of acquisition of the schedule list recorded on the RAM 213, and then advances the processing to step S1704.

In step S1704, the suggestion service 310 collects information related to files registered in schedule information included in the selected schedule, thus creating an information material list. The information material list is created by acquiring information about files recorded in information material items of the schedule information and, if storage location information about files is included in information written in detailed information, by acquiring the storage location information. In a case where a folder is designated as storage location information about the detailed information, the suggestion service 310 can perform processing for acquiring, from the file server 320, a list of files stored in the designated folder. After creating and recording the information material list on the RAM 213, the suggestion service 310 advances the processing to step S1705.

In step S1705, the suggestion service 310 determines whether there is any unselected information material (file) in the information material list recorded on the RAM 213. If it is determined that there is an unselected file (YES in step S1705), the suggestion service 310 advances the processing to step S1706, and, if it is determined that there is no unselected file (NO in step S1705), the suggestion service 310 discards the information material list from the RAM 213, and returns the processing to step S1702.

In step S1706, the suggestion service 310 selects one unselected file in the information material list recorded on the RAM 213, and then advances the processing to step S1707.

In step S1707, the suggestion service 310 reads out a print candidate file list from the HDD 214, searches for the file selected in step S1706 from the print candidate file list, reads out file attribute information about the selected file, and then advances the processing to step S1708.

In step S1708, the suggestion service 310 determines the priority of the selected file based on schedule information about the selected file and the read-out file attribute information. The suggestion service 310 records, on the RAM 213, the determined priority as an estimation result list along with the file ID, and then advances the processing to step S1709.

In step S1709, the suggestion service 310 determines a reason for priority for that the priority has been determined in step S1708. Here, the suggestion service 310 determines that the reason for priority is information indicating that the file is information recorded in connection with a schedule, and thus determines the reason for priority based on the schedule information and the file attribute information.

For example, in the case of a file that is preliminarily registered as an accompanying material for a meeting A the start time of which is Oct. 18, 2021, 15:00, the suggestion service 310 determines information "10/18 15:00 an information material for the meeting A" as the reason for priority. The suggestion service 310 records the determined reason for priority in a reason-for-priority item in the estimation result list, and then returns the processing to step S1705.

In step S1710, the suggestion service 310 sorts the estimation result list stored in the RAM 213 by the priority setting, and then advances the processing to step S1711. Here, with regard to a candidate to which the priority setting is not set, the suggestion service 310 determines that such a candidate is lower in priority than a candidate to which the priority setting is set.

In step S1711, the suggestion service 310 stores the estimation result list sorted in step S1710 in the HDD 214, and then ends the processing in the present flowchart.

Figure 17B:
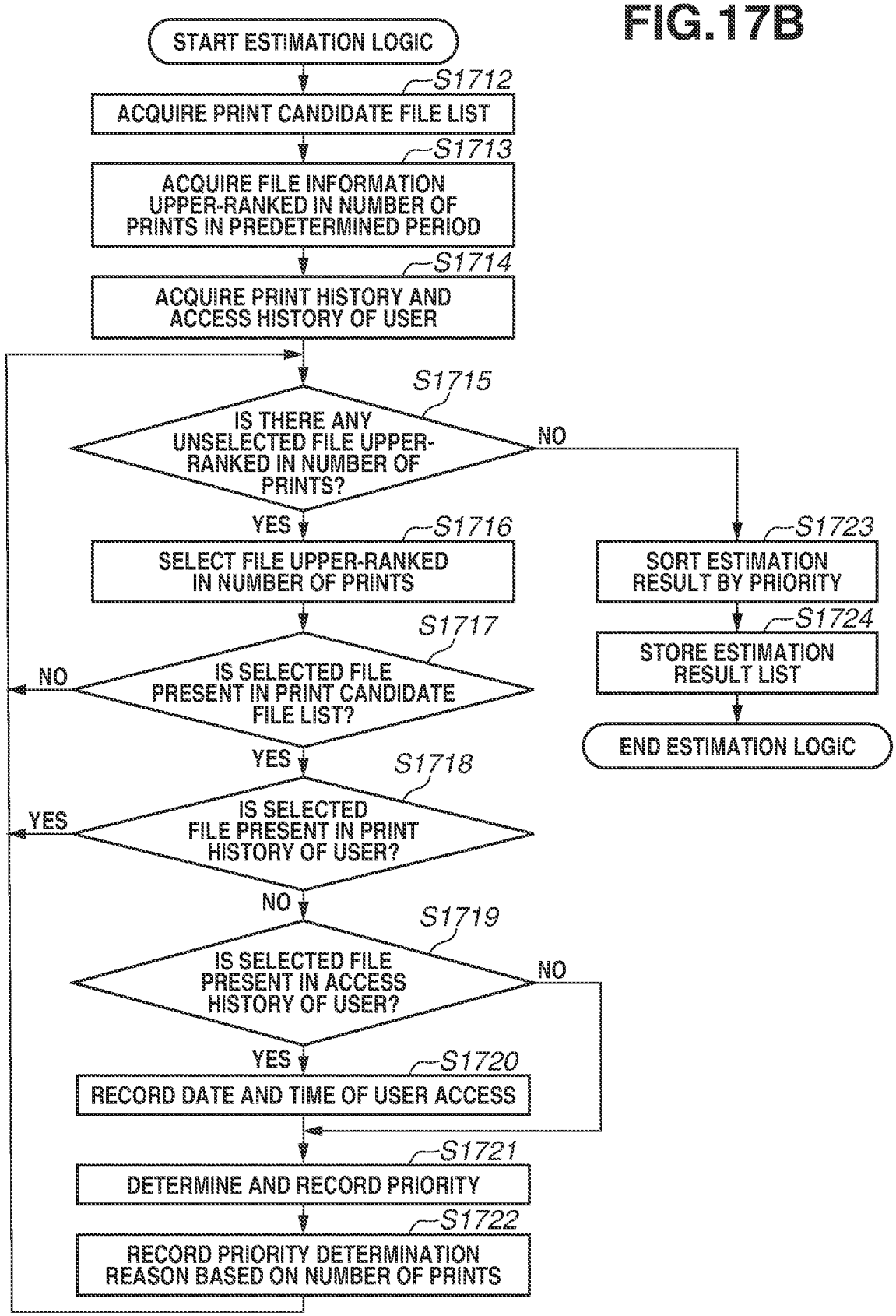

FIG. 17B is a flowchart illustrating an estimation logic that is based on a use status of another user, which is one of estimation logic execution processing operations to be performed in step S1504 illustrated in FIG. 15. This processing is performed by the suggestion service 310, which runs by a control program read out from the ROM 212 and loaded onto the RAM 213 by the CPU 211 included in the application server 102.

In step S1712, the suggestion service 310 reads out a print candidate file list from the HDD 214, records the print candidate file list on the RAM 213, and then advances the processing to step S1713.

In step S1713, the suggestion service 310 acquires, from the file server 320, file information upper-ranked in the number of prints in a predetermined period. The suggestion service 310 specifies a file that many user have printed, from a print history recorded on the file server 320, and acquires the specified file. Then, the suggestion service 310 records a list of the acquired files upper-ranked in the number of prints on the RAM 213, and then advances the processing to step S1714. Here, the predetermined period can be designated as an optional period by the user or can be a period previously defined on the suggestion service 310. With regard to the determination for file information upper-ranked in the number of prints, the suggestion service 310 can designate the number of prints and acquire all of the files each having a print history larger than or equal to the designated number of prints, or can acquire files until the number of acquired files reaches a predetermined number from the file upper-ranked in the number of prints.

In step S1714, the suggestion service 310 acquires a print history of the target user from the file server 320. The suggestion service 310 designates a user with respect to the file server 320, and acquires a history indicating that the designated user previously printed a file stored in the file server 320 and a history indicating that the designated user previously accessed the file. The suggestion service 310 records the acquired print history and access history on the RAM 213, and then advances the processing to step S1715. With regard to a print history and an access history to be acquired from the file server 320, the suggestion service 310 can acquire all of the histories stored in the file server 320 or can designate the number of histories or a period in which histories are included.

In step S1715, the suggestion service 310 determines whether there is any unselected file in the list of files upper-ranked in the number of prints. If it is determined that there is an unselected file (YES in step S1715), the suggestion service 310 advances the processing to step S1716, and, if it is determined that there is no unselected file (NO in step S1715), the suggestion service 310 advances the processing to step S1723.

In step S1716, the suggestion service 310 selects an unselected most upper-ranked file in the list of files upper-ranked in the number of prints recorded on the RAM 213, and then advances the processing to step S1717.

In step S1717, the suggestion service 310 determines whether the file selected in step S1716 is present in the print candidate file list. If it is determined that the selected file is present in the print candidate file list (YES in step S1717), the suggestion service 310 advances the processing to step S1718, and, if it is determined that the selected file is not present in the print candidate file list (NO in step S1717), the suggestion service 310 returns the processing to step S1715.

In step S1718, the suggestion service 310 determines whether the file selected in step S1716 is present in the print history of the user. If it is determined that the file is present in the print history (YES in step S1718), the suggestion service 310 determines that the file is an already printed file and then returns the processing to step S1715, and, if it is determined that the file is not present in the print history (NO in step S1718), the suggestion service 310 advances the processing to step S1719.

In step S1719, the suggestion service 310 determines whether the file selected in step S1716 is present in the access history of the user. If it is determined that the file is present in the access history (YES in step S1719), the suggestion service 310 determines that the file is a file in which the user took interest and then advances the processing to step S1720, and, if it is determined that the file is not present in the access history (NO in step S1719), the suggestion service 310 advances the processing to step S1721.

In step S1720, the suggestion service 310 adds, to information about the file selected in step S1716, information about the access date and time when the user accessed the file, records the information obtained by addition on the RAM 213, and then advances the processing to step S1721.

In step S1721, the suggestion service 310 determines the priority of the file recorded on the RAM 213 with use of the number of prints and the access date and time. The suggestion service 310 records the determined priority as an estimation result list along with the file ID on the RAM 213, and then advances the processing to step S1722.

In step S1722, the suggestion service 310 determines a reason for priority for which the priority has been determined in step S1721. Here, as the reason for priority, the suggestion service 310 writes a determination reason for which the suggestion service 310 has determined that the file is to be prioritized based on the number of prints and the access date and time. For example, in a case where there is an access history, the suggestion service 310 writes information "the number of persons who performed printing is X, and the access date and time is 2021/10/05", and, in a case where there is no access history, the suggestion service 310 writes information "the number of persons who performed printing is X". The suggestion service 310 records the determined reason for priority in a reason-for-priority item in the estimation result list, and then returns the processing to step S1715.

In step S1723, the suggestion service 310 sorts the estimation result list stored in the RAM 213 by the priority setting, and then advances the processing to step S1724. Here, with regard to a candidate to which the priority setting is not set, the suggestion service 310 determines that such a candidate is lower in priority than a candidate to which the priority setting is set.

In step S1724, the suggestion service 310 stores the estimation result list sorted in step S1723 in the HDD 214, and then ends the processing in the present flowchart.

Figure 17C:
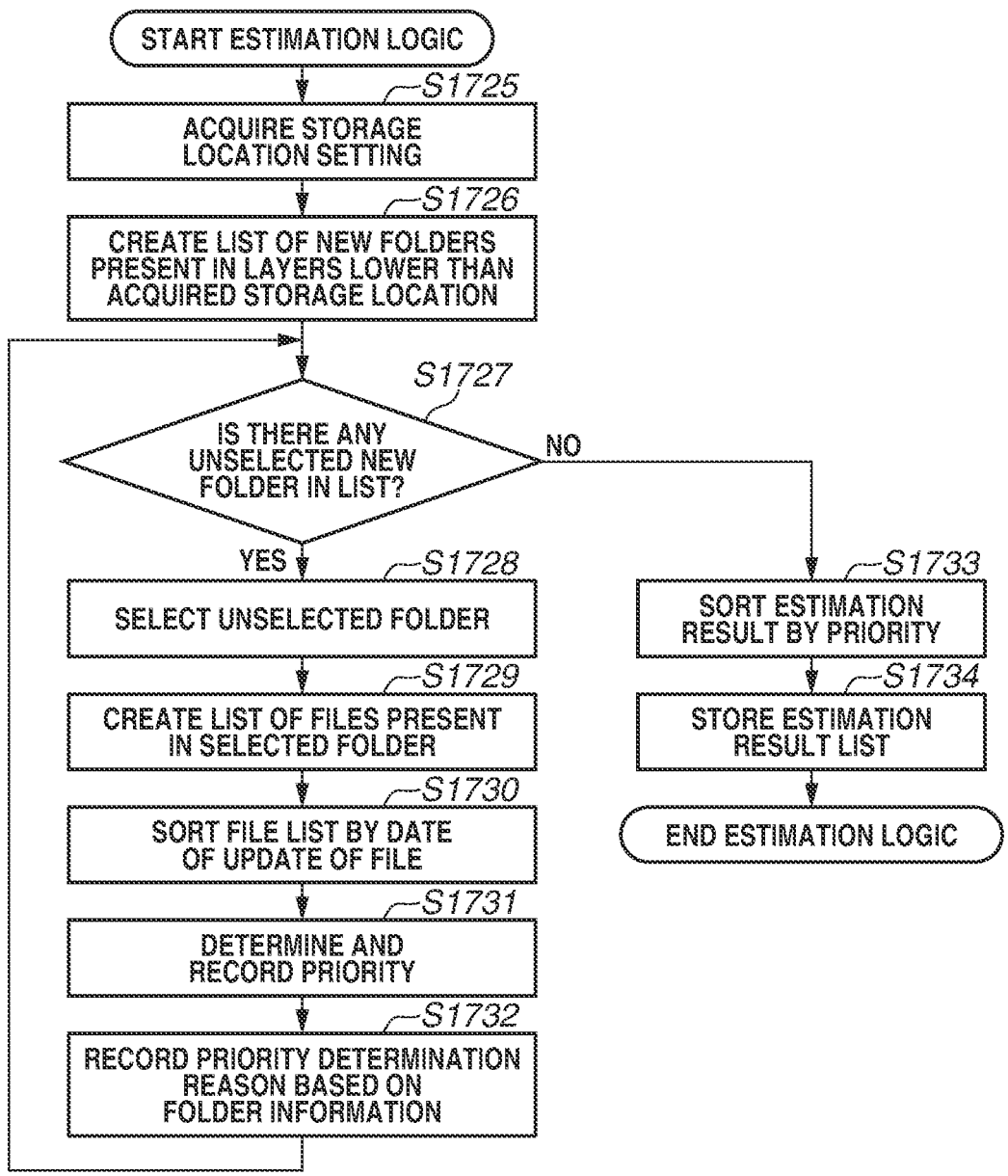

FIG. 17C is a flowchart illustrating an estimation logic that is based on a predetermined storage location, which is one of estimation logic execution processing operations to be performed in step S1504 illustrated in FIG. 15. This processing is performed by the suggestion service 310, which runs by a control program read out from the ROM 212 and loaded onto the RAM 213 by the CPU 211 included in the application server 102.

In step S1725, the suggestion service 310 acquires setting of a predetermined storage location from the setting of an estimation logic that is based on a predetermined storage location of the print candidate estimation processing. Then, the suggestion service 310 records information about the acquired predetermined storage location on the RAM 213, and then advances the processing to step S1726. Here, as the setting of a predetermined storage location, a plurality of locations of folders on the file server 320 is assumed to be able to be registered, and the suggestion service 310 reads out all of the registered storage locations and records information about such locations on the RAM 213.

In step S1726, the suggestion service 310 creates a list of folders present in layers lower than the folder designated as a predetermined storage location. In a case where a plurality of predetermined storage locations is registered, the suggestion service 310 performs similar processing on each storage location to create a list of folders. The list of folders to be created here can be a list of all of the target folders. To reduce the number of folders, the list of folder to be created here can be a list of only folders the date and time of creation of which is later than or equal to the last estimation logic execution date and time, or can be a list of only folders created before a predetermined period. In a case where only a folder is present in a folder present in a layer lower than the designated folder, without creating a list of folders, the suggestion service 310 can check folders present in a lower layer. In a case where neither file nor folder is present in a folder, the suggestion service 310 does not need to record the folder in a list of folders. After creating a list of folders, the suggestion service 310 stores the created list of folders in the RAM 213, and then advances the processing to step S1727.

In step S1727, the suggestion service 310 determines whether there is any unselected folder in the list of folders. If it is determined that there is an unselected folder (YES in step S1727), the suggestion service 310 advances the processing to step S1728, and, if it is determined that there is no unselected folder (NO in step S1727), the suggestion service 310 advances the processing to step S1733.

In step S1728, the suggestion service 310 selects one unselected folder in the list of folders recorded on the RAM 213, and then advances the processing to step S1729.

In step S1729, the suggestion service 310 creates a list of files present in the selected folder. Here, the suggestion service 310 targets only files of the type serving as a print target, and deletes a folder or a file not serving as a print target from the list. After creating a list of files, the suggestion service 310 records the list of files on the RAM 213, and then advances the processing to step S1730.

In step S1730, the suggestion service 310 sorts the list of files recorded on the RAM 213 in the order of files the date of update of which is newer. Then, the suggestion service 310 deletes files the date of update of which is older than the creation date of the folder from the list of files. Then, the suggestion service 310 stores information about a file the date of update of which is newest in the remaining files in the RAM 213, and then advances the processing to step S1731.

In step S1731, the suggestion service 310 determines the priority of the file recorded on the RAM 213 with use of the predetermined storage location, information about the folder list, and the file attribute information. The suggestion service 310 records the determined priority as an estimation result list along with the file ID on the RAM 213, and then advances the processing to step S1732.

In step S1732, the suggestion service 310 determines a reason for priority for which the priority has been determined in step S1731. Here, the suggestion service 310 determines the reason for priority based on determining that the file is to be prioritized in the predetermined storage location with use of the predetermined storage location, information about the folder list, and the file attribute information. For example, the suggestion service 310 determines information "an updated file in the folder YYYY or lower folder" as the reason for priority. The suggestion service 310 records the determined reason for priority in a reason-for-priority item in the estimation result list, and then returns the processing to step S1727.

In step S1733, the suggestion service 310 sorts the estimation result list stored in the RAM 213 by the priority setting, and then advances the processing to step S1734. Here, with regard to a candidate to which the priority setting is not set, the suggestion service 310 determines that such a candidate is lower in priority than a candidate to which the priority setting is set.

In step S1734, the suggestion service 310 stores the estimation result list sorted in step S1733 in the HDD 214, and then ends the processing in the present flowchart.

Figure 17D:
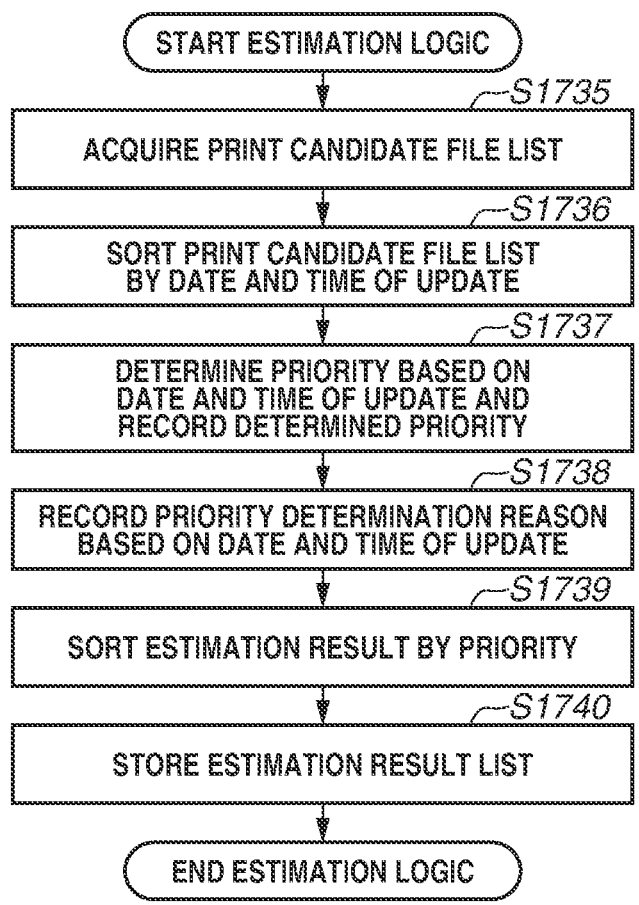

FIG. 17D is a flowchart illustrating an estimation logic that is based on the date and time of update, which is one of estimation logic execution processing operations to be performed in step S1504 illustrated in FIG. 15. This processing is performed by the suggestion service 310, which runs by a control program read out from the ROM 212 and loaded onto the RAM 213 by the CPU 211 included in the application server 102.

In step S1735, the suggestion service 310 reads out a print candidate file list from the HDD 214, records the print candidate file list on the RAM 213, and then advances the processing to step S1736.

In step S1736, the suggestion service 310 sorts the readout print candidate file list by the date and time of update, records the sorted print candidate file list on the RAM 213, and then advances the processing to step S1737.

In step S1737, the suggestion service 310 determines the priority of a file in the order of files the date and time of update of which is newer in the print candidate file list sorted in step S1736. The suggestion service 310 records the determined priority as an estimation result list along with the file ID on the RAM 213, and then advances the processing to step S1738. Here, the suggestion service 310 is assumed to allocate the priority "10" to a file the date and time of update is newest in the files included in the print candidate file list, allocate the priority "9" to a file the date and time of update is next newest, thus allocate the successive priorities to ten upper-ranked files in sequence, and allocate the priority "0" to the remaining files. Additionally, for example, the suggestion service 310 can allocate the successive priorities to files starting with newer files and allocate the priority "1" to the remaining files, or can set the priorities while sectioning a period from the current date and time.

In step S1738, the suggestion service 310 determines a reason for priority for which the priority has been determined in step S1737. Here, the suggestion service 310 determines the reason for priority based on the date and time of update. For example, here, in a case where there is a file the date and time of update of which is Oct. 10, 2021, half past fourteen, the suggestion service 310 determines information "2021/10/10 14:30 updated" as the reason for priority. The suggestion service 310 records the determined reason for priority in a reason-for-priority item in the estimation result list, and then advances the processing to step S1739.

In step S1739, the suggestion service 310 sorts the estimation result list stored in the RAM 213 by the priority setting, and then advances the processing to step S1740. Here, with regard to a candidate to which the priority setting is not set, the suggestion service 310 determines that such a candidate is lower in priority than a candidate to which the priority setting is set.

In step S1740, the suggestion service 310 stores the estimation result list sorted in step S1739 in the HDD 214, and then ends the processing in the present flowchart.

Figure 18A:
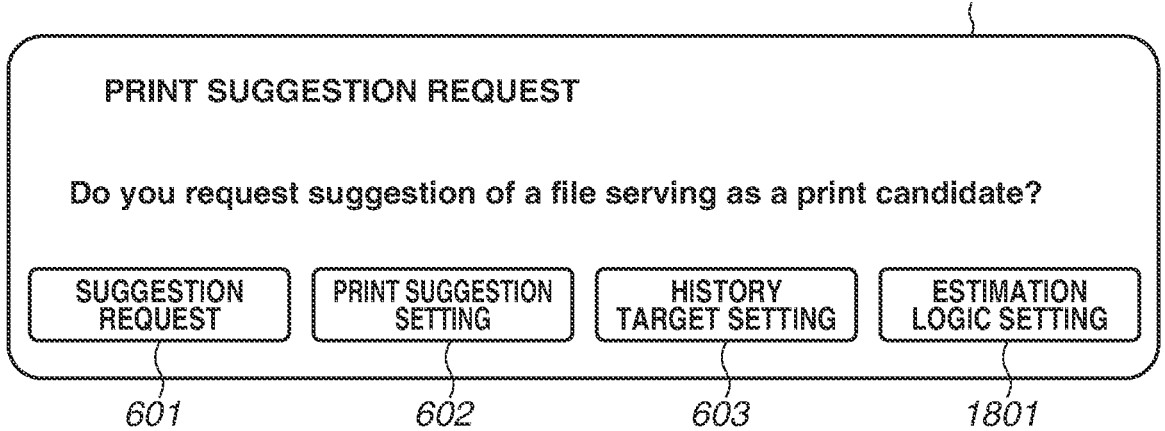
FIGS. 18A and 18B are diagrams illustrating examples of a print suggestion screen.
Figure 18B:
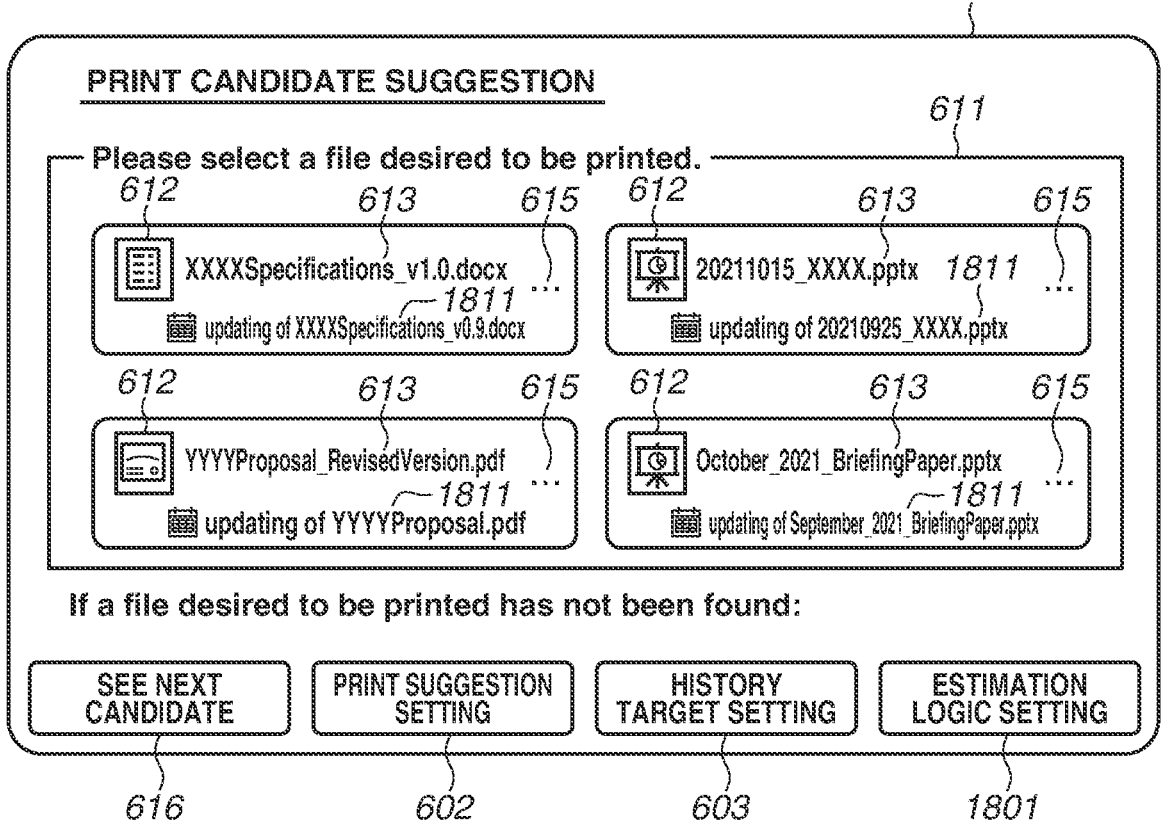

FIGS. 18A and 18B each illustrate an example of a screen that the notification application 300 displays to the user, and that is displayed on the display 208 of the PC 101. A print suggestion screen can be displayed as a pop-up screen on the PC 101, or can be displayed as one notification of a chat application or collaboration tool that runs on the PC 101. Here, elements having configurations common to those illustrated in FIGS. 6A and 6B in the first exemplary embodiment have the respective same functions as those in the first exemplary embodiment, and are, therefore, omitted from description.

FIG. 18A illustrates an example of a screen via which the user makes a print suggestion request, so that, via the screen, the user can issue instructions for a request for print suggestion and for transition to a setting screen concerning the print suggestion. A print suggestion request screen 1800 is configured with a suggestion request button 601, a print suggestion setting button 602, a history target setting button 603, and an estimation logic setting button 1801. The suggestion request button 601 to the history target setting button 603 are buttons having the respective same functions as those in the first exemplary embodiment. The estimation logic setting button 1801 is a button used to issue an instruction for print candidate estimation setting to the notification application 300, and, when the estimation logic setting button 1801 is selected, the print suggestion request screen 1800 transitions to the setting screen 1600.

FIG. 18B illustrates an example of a print suggestion screen for notifying the user of a print suggestion. A print candidate suggestion screen 1810 is configured with a print suggestion display region 611, a "see next candidate" button 616, a print suggestion setting button 602, a history target setting button 603, and an estimation logic setting button 1801. The print suggestion display region 611 has a configuration including a plurality of pieces of print suggestion file information 612 equivalent to that illustrated in FIG. 6B, and, as a reason for priority in the print suggestion file information 612, a reason for priority in an estimation logic determined to be most prioritized in the print candidate estimation processing is written.

With the above-described operations of the printing system in the second exemplary embodiment, at timing when the user has requested a print candidate, the user can receive a notification about a print candidate list that the printing system has determined based on schedule information about a print history itself or a file configuration. Then, the user can determine whether to perform printing, based on the content of the notification. This enables reducing the user's trouble of searching for an information material to be printed. The first exemplary embodiment and the second exemplary embodiment can be implemented in combination or can be implemented independently of each other.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While exemplary embodiments have been described, these embodiments are not seen to be limiting. The scope of the following claims is to be accorded the broadest interpretation so as to encompass all such modifications and equivalent structures and functions.

This application claims the benefit of Japanese Patent Application No. 2022-037902 filed Mar. 11, 2022, which is hereby incorporated by reference herein in its entirety.

What is claimed is:

1. A printing system comprising:
a printing apparatus,
wherein the printing apparatus is configured to print, based on a file, an image on a sheet;
a server,
wherein the server is configured to select one or more files; and
an information processing apparatus,
wherein a chat application installed in the information processing apparatus is configured to display one or more objects corresponding to the selected one or more files on a display, and the selected one or more files are registered on a print candidate list that is generated with priority estimation of the print candidate list,
wherein the chat application installed in the information processing apparatus is configured to display, based on selection of an object from the displayed one or more objects, a plurality of objects corresponding to a plurality of files similar to a file corresponding to the object selected from the displayed one or more objects, the plurality of files similar to the file corresponding to the object selected from the displayed one or more objects are searched for a similar file to a printed file written in print history from the print candidate list, and the plurality of files are displayed in an order determined based on a file format and a file name of a respective file of the plurality of files, and
wherein the printing apparatus is configured to print, based on a file selected from the plurality of files similar to the file corresponding to the object selected from the displayed one or more objects, an image on a sheet.

2. The printing system according to claim 1,
wherein the server transmits information of the selected one or more files to the information processing apparatus, and
wherein the chat application installed in the information processing apparatus displays, based on the transmitted information, the one or more objects corresponding to the selected one or more files.

3. The printing system according to claim 1, wherein the one or more objects are posted in a talk room of a chat service displayed by the chat application.

4. The printing system according to claim 1, wherein the one or more files are selected based on information indicating a frequency at which a user has accessed the one or more files.

5. The printing system according to claim 1, wherein the one or more files are selected based on one or more update histories of the one or more files by a user.

6. The printing system according to claim 1,
wherein the server is further configured to set the number of files to be selected by the server, and
wherein the server selects the one or more files based on the set number of files.

7. The printing system according to claim 1, wherein the server is further configured to determine a priority in the selected one or more files, and
wherein the one or more objects corresponding to the selected one or more files are displayed in an order based on the determined priority.

8. A printing method comprising:
printing, based on a file, an image on a sheet;
selecting one or more files;
displaying one or more objects corresponding to the selected one or more files on a display, and the selected one or more files are registered on a print candidate list that is generated with priority estimation of the print candidate list;
displaying, based on selection of an object from the displayed one or more objects, a plurality of objects corresponding to a plurality of files similar to a file corresponding to the object selected from the displayed one or more objects, wherein the plurality of files similar to the file corresponding to the object selected from the displayed one or more objects are searched for a similar file to a printed file written in print history from the print candidate list, and the plurality of files are displayed in an order determined based on a file format and a file name of a respective file of the plurality of files; and
printing, based on a file selected from the plurality of files similar to the file corresponding to the object selected from the displayed one or more objects, an image on a sheet.

9. A non-transitory computer-readable storage medium storing computer-executable instructions that, when executed by a computer, cause the computer to perform a method, the method comprising:
printing, based on a file, an image on a sheet;
selecting one or more files;
displaying one or more objects corresponding to the selected one or more files on a display, and the selected one or more files are registered on a print candidate list that is generated with priority estimation of the print candidate list;

displaying, based on selection of an object from the displayed one or more objects, a plurality of objects corresponding to a plurality of files similar to a file corresponding to the object selected from the displayed one or more objects, wherein the plurality of files similar to the file corresponding to the object selected from the displayed one or more objects are searched for a similar file to a printed file written in print history from the print candidate list, and the plurality of files are displayed in an order determined based on a file format and a file name of a respective file of the plurality of files; and printing, based on a file selected from the plurality of files similar to the file corresponding to the object selected from the displayed one or more objects, an image on a sheet.

* * * * *